US012559154B2

(12) United States Patent
Zhu et al.

(10) Patent No.: US 12,559,154 B2
(45) Date of Patent: Feb. 24, 2026

(54) FOLDABLE LOCKING MECHANISM

(71) Applicant: WONDERLAND SWITZERLAND AG, Steinhausen (CH)

(72) Inventors: Wanquan Zhu, Steinhausen (CH); Jialiang Yuan, Steinhausen (CH)

(73) Assignee: Wonderland Switzerland AG, Steinhausen (CH)

( * ) Notice: Subject to any disclaimer, the term of this patent is extended or adjusted under 35 U.S.C. 154(b) by 595 days.

(21) Appl. No.: 17/917,486

(22) PCT Filed: Apr. 8, 2021

(86) PCT No.: PCT/EP2021/059228
§ 371 (c)(1),
(2) Date: Oct. 6, 2022

(87) PCT Pub. No.: WO2021/204966
PCT Pub. Date: Oct. 14, 2021

(65) Prior Publication Data
US 2023/0159078 A1     May 25, 2023

(30) Foreign Application Priority Data

Apr. 10, 2020     (CN) .......................... 202010284012.7

(51) Int. Cl.
*B62B 7/06*          (2006.01)
*B62B 7/08*          (2006.01)
*F16C 11/10*         (2006.01)
(52) U.S. Cl.
CPC ................ *B62B 7/062* (2013.01); *B62B 7/08* (2013.01); *F16C 11/103* (2013.01);
(Continued)

(58) Field of Classification Search
CPC .. B62B 7/06; B62B 7/062; B62B 7/08; B62B 2205/18; B62B 2205/20; B62B 2205/22;
(Continued)

(56) References Cited

U.S. PATENT DOCUMENTS

| 8,376,375 | B2 * | 2/2013 | Mival | ....................... | B62B 7/08 |
| | | | | | 280/47.38 |
| 2009/0121455 | A1 * | 5/2009 | Kretschmer | ............ | B62B 7/062 |
| | | | | | 280/642 |
| 2017/0297599 | A1 | 10/2017 | Zhong | | |

FOREIGN PATENT DOCUMENTS

| AU | 2004100801 A4 * | 11/2004 | ............... | B62B 7/08 |
| CN | 2595623 Y | 12/2003 | | |

(Continued)

OTHER PUBLICATIONS

Search Report mailed in corresponding International Patent Application No. PCT/EP2021/059228 on Jun. 15, 2021, consisting of 3 pp.

(Continued)

*Primary Examiner* — Josh Skroupa
(74) *Attorney, Agent, or Firm* — Volpe Koenig

(57)     ABSTRACT

A foldable locking mechanism (300,500) adapted for a frame body (400) includes a first mounting seat (1), a second mounting seat (2), a third mounting seat (4), a first locking component (3) and a driving component (1*a*,2*a*). The second mounting seat (2) is pivotally connected to the first mounting seat (1) and the third mounting seat (4). The first locking component (3) is at least partially disposed between the second mounting seat (2) and the third mounting seat (4) and movable between a first releasing position and a first locking position for allowing or restraining a relative pivotal movement of the second mounting seat (2) and the third mounting seat (4). The driving component (1*a*,2*a*) is disposed on the first mounting seat (1) and abuts against the first locking (Continued)

B component (3). The driving component (1a,2a) is configured to drive the first locking component (3) to move to the first releasing position to allow a folding operation of the fold-able locking mechanism (300,500) for allowing a folding operation of the frame body (400).

31 Claims, 18 Drawing Sheets

(52) U.S. Cl.
CPC ... *B62B 2205/20* (2013.01); *Y10T 403/32327* (2015.01); *Y10T 403/32557* (2015.01)

(58) Field of Classification Search
CPC ......... F16C 11/04; F16C 11/10; F16C 11/103; Y10T 403/32262; Y10T 403/32319; Y10T 403/32327; Y10T 403/32336; Y10T 403/32361; Y10T 403/32377; Y10T 403/32385; Y10T 403/32401; Y10T 403/32409; Y10T 403/32418; Y10T 403/32442; Y10T 403/32451; Y10T 403/32459; Y10T 403/32557; Y10T 403/32581; Y10T 403/32591
USPC .... 403/84, 91, 92, 93, 96, 98, 99, 101, 102, 403/103, 106, 107, 108, 113, 116, 117
See application file for complete search history.

(56) References Cited

FOREIGN PATENT DOCUMENTS

| | | | | | |
|---|---|---|---|---|---|
| CN | 101624059 | A | 1/2010 | | |
| CN | 107813858 | A | 3/2018 | | |
| CN | 108791455 | A | 11/2018 | | |
| CN | 208827909 | U | 5/2019 | | |
| CN | 211364686 | U | 8/2020 | | |
| EP | 2039585 | A2 | 3/2009 | | |
| EP | 22039585 | A2 | 3/2009 | | |
| EP | 2363334 | A1 | 9/2011 | | |
| EP | 2965969 | A1 | 1/2016 | | |
| EP | 2965969 | B1 | 12/2017 | | |
| GB | 2418179 | A | * | 3/2006 | ............. B62B 7/147 |
| JP | 200973479 | A | 4/2009 | | |
| JP | 3174293 | U | 3/2012 | | |
| TW | 584985 | B | 6/2017 | | |
| TW | 201912479 | A | 4/2019 | | |
| WO | WO-2017054312 | A1 | * | 4/2017 | ............... B62B 7/06 |

OTHER PUBLICATIONS

Written Opinion mailed in corresponding International Patent Application No. PCT/EP2021/059228 on Jun. 15, 2021, consisting of 5 pp.

* cited by examiner

FOLDABLE LOCKING MECHANISM

CROSS REFERENCE TO RELATED APPLICATIONS

This application is a 371 U.S. National Phase of International Application No. PCT/EP2021/059228, filed on Apr. 8, 2021, which claims priority to Chinese Patent Application No. 202010284012.7, filed Apr. 10, 2020, which are incorporated by reference as if fully set forth.

FIELD OF THE INVENTION

The present invention relates to a foldable locking mechanism according to the pre-characterizing clause of claim 1.

BACKGROUND OF THE INVENTION

A child carrier, such as a child stroller, usually has a foldable frame body to improve practicability and transportation convenience. When it is desired to use the child carrier, a user can unfold the child carrier to an unfolded state. When it is not required to use the child carrier, the user can fold the child carrier to a folded state to reduce an occupied space of the child carrier for easy storage and easy transportation.

The conventional foldable frame body usually includes a plurality of rods which can be categorized according to functions into a backrest, a seat, a rear leg, a front leg and a handle, and a locking device disposed between the plurality of rods for locking or unlocking the plurality of rods. However, the conventional locking device has complicated structure and is incapable of unlocking the plurality of rods at a same time. Furthermore, since the conventional locking device is actuated by a releasing button, a user has to bend down to operate the release button. Therefore, the conventional locking device is not convenient in use and needs improvement.

SUMMARY OF THE INVENTION

This is mind, the present invention aims at providing a foldable locking mechanism which is adapted for a frame body and has advantages of simple structure and easy operation.

This is achieved by a foldable locking mechanism according to claim 1. The dependent claims pertain to corresponding further developments and improvements.

As will be seen more clearly from the detail description following below, the claimed foldable locking mechanism includes a first mounting seat, a second mounting seat, a third mounting seat, a first locking component and a driving component. The second mounting seat is pivotally connected to the first mounting seat. The third mounting seat is pivotally connected to the second mounting seat. The first locking component is at least partially and movably disposed between the second mounting seat and the third mounting seat. The first locking component is movable between a first releasing position and a first locking position. A relative pivotal movement of the second mounting seat and the third mounting seat is allowed when the first locking component is located at the first releasing position. The relative pivotal movement of the second mounting seat and the third mounting seat is restrained when the first locking component is located at the first locking position. The driving component is disposed on the first mounting seat and abuts against the first locking component. The driving component is configured to drive the first locking component to move from the first locking position to the first releasing position for allowing a folding operation of the foldable locking mechanism.

According to an embodiment of the present invention, the foldable locking mechanism further includes a fourth mounting seat and a second locking component. The fourth mounting seat is pivotally connected to the third mounting seat. The second locking component at least partially and movably disposed between third mounting seat and the fourth mounting seat. The second locking component is movable between a second releasing position and a second locking position. A relative pivotal movement of the third mounting seat and the fourth mounting seat is allowed when the second locking component is located at the second releasing position. The relative pivotal movement of the third mounting seat and the fourth mounting seat is restrained when the second locking component is located at the second locking position. The second locking component abuts against the first locking component, and the first locking component drives the second locking component to move from the second locking position to the second releasing position when the first locking component moves from the first locking position to the first releasing position.

According to an embodiment of the present invention, the foldable locking mechanism further includes a fifth mounting seat and a third locking component. The fifth mounting seat is pivotally connected to the fourth mounting seat. The third locking component is at least partially and movably disposed between the fourth mounting seat and the fifth mounting seat. The third locking component is movable between a third releasing position and a third locking position. A relative pivotal movement of the fourth mounting seat and the fifth mounting seat is allowed when the third locking component is located at the third releasing position. The relative pivotal movement of the fourth mounting seat and the fifth mounting seat is restrained when the third locking component is located at the third locking position. The third locking component abuts against the second locking component, and the second locking component drives the third locking component to move from the third locking position to the third releasing position when the second locking component moves from the second locking position to the second releasing position.

According to an embodiment of the present invention, the driving component includes a pushing portion disposed on the first mounting seat. The first locking component includes a pushed portion extending toward the pushing portion, and the pushing portion pushes the pushed portion to drive the first locking component to move from the first locking position to the first releasing position when the first mounting seat and the second mounting seat are pivotally folded relative to each other.

According to an embodiment of the present invention, the pushing portion is a pushing inclined surface disposed on the first mounting seat, and the pushed portion is a protrusion cooperating with the pushing inclined surface.

According to an embodiment of the present invention, the pushing inclined surface is helical.

According to an embodiment of the present invention, a through hole is formed on the second mounting seat and located a position corresponding to the pushed portion, and the pushed portion slidably passes through the through hole.

According to an embodiment of the present invention, the first locking component is movable along an axial direction of a pivoting axis of the second mounting seat and the third mounting seat.

According to an embodiment of the present invention, the first locking component includes a first engaging tooth. The second mounting seat includes a first left engaged tooth cooperating with the first engaging tooth. The third mounting seat includes a first right engaged tooth cooperating with the first engaging tooth. The first engaging tooth engages with the first left engaged tooth and the first right engaged tooth when the first locking component is located at the first locking position, and the first engaging tooth disengages from the first left engaged tooth when the first locking component is located at the first releasing position.

According to an embodiment of the present invention, the foldable locking mechanism further includes a first resilient component for driving the first locking component to move toward the first locking position.

According to an embodiment of the present invention, the first locking component includes a first abutting portion extending toward the second locking component, and the first abutting portion passes through the third mounting seat to abut against the second locking component.

According to an embodiment of the present invention, a penetrating hole is formed on the third mounting seat and located at a position corresponding to the first abutting portion.

According to an embodiment of the present invention, the second locking component is movable along an axial direction of a pivoting axis of the third mounting seat and the fourth mounting seat.

According to an embodiment of the present invention, the second locking component includes a second engaging tooth. The third mounting seat includes a second left engaged tooth cooperating with the second engaging tooth. The fourth mounting seat includes a second right engaged tooth cooperating with the second engaging tooth. The second engaging tooth engages with the second left engaged tooth and the second right engaged tooth when the second locking component is located at the second locking position, and the second engaging tooth disengages from the second left engaged tooth when the second locking component is located at the second releasing position.

According to an embodiment of the present invention, the foldable locking mechanism further includes a second resilient component for driving the second locking component to move toward the second locking position.

According to an embodiment of the present invention, the second locking component includes a second abutting portion extending toward the third locking component, and the second abutting portion passes through the fourth mounting seat to abut against the third locking component.

According to an embodiment of the present invention, a penetrating hole is formed on the fourth mounting seat and located at a position corresponding to the second abutting portion.

According to an embodiment of the present invention, the third locking component is movable along an axial direction of a pivoting axis of the fourth mounting seat and the fifth mounting seat.

According to an embodiment of the present invention, the third locking component includes a third engaging tooth. The fourth mounting seat includes a third engaging tooth cooperating with the third engaging tooth. The fifth mounting seat includes a third right engaged tooth cooperating with the third engaging tooth. The third engaging tooth engages with the third engaging tooth and the third right engaged tooth when the third locking component is located at the third locking position, and the third engaging tooth disengages from the third engaging tooth when the third locking component is located at the third releasing position.

According to an embodiment of the present invention, the foldable locking mechanism further includes a third resilient component for driving the third locking component to move toward the third locking position.

According to an embodiment of the present invention, the foldable locking mechanism further includes a limiting assembly for limiting a relative pivotal angle of the first mounting seat and the second mounting seat.

According to an embodiment of the present invention, the limiting assembly includes a limiting component installed on the second mounting seat and protruding toward the first mounting seat. A limiting slot is formed on the first mounting seat and located at a position corresponding to the limiting component, and the limiting component slidably stretches into the limiting slot.

According to an embodiment of the present invention, the limiting assembly further includes a fourth resilient component. The limiting component is installed on the second mounting seat by the fourth resilient component, and the fourth resilient component is for driving the limiting component to resiliently abut against the limiting slot.

According to an embodiment of the present invention, the limiting component is a circular column.

According to an embodiment of the present invention, a passing hole is formed on the second mounting seat and located at a position corresponding to the limiting component, and the limiting component slidably passes through the passing hole.

According to an embodiment of the present invention, the driving component includes a pushing component and a driven component. The pushing component is pivotally connected to the first mounting seat. The driven component is movably disposed between the pushing component and the first locking component and movable between an extending position and a retracting position, and the pushing component pivots to drive the driven component to move from the retracting position to the extending position to push the first locking component from the first locking position to the first releasing position for allowing the folding operation of the foldable locking mechanism.

According to an embodiment of the present invention, the driving component further includes a linking component connected to the pushing component and for driving the pushing component to pivot.

According to an embodiment of the present invention, the pushing component includes an adjoining portion extending toward the driven component. The driven component includes an adjoined portion, and the adjoining portion is configured to push the adjoined portion to drive the driven component to move from the retracting position to the extending position.

According to an embodiment of the present invention, the adjoining portion is an adjoining protrusion. The adjoined portion is an adjoined protrusion. The adjoining protrusion and the adjoined protrusion are misaligned from each other when the driven component is located at the retracting position, and the adjoining protrusion and the adjoined protrusion are aligned with and abutted against each other when the driven component is located at the extending position.

According to an embodiment of the present invention, the driven component includes a pushing abutting portion. The first locking component includes a pushed portion extending toward the pushing abutting portion, and the pushing abutting portion pushes the pushed portion to drive the first locking component to move from the first locking position to the first releasing position when the driven component moves from the retracting position to the extending position.

According to an embodiment of the present invention, the driven component is movable along an axial direction of a pivoting axis of the first mounting seat and the second mounting seat.

In contrast to the prior art, in the present invention, when the first mounting seat, the second mounting seat and the third mounting seat of the foldable locking mechanism are connected to different rods of a frame body, the foldable locking mechanism can use the driving component to move the first locking component to the first releasing position to allow a relative pivotal movement of the first mounting seat and the second mounting seat and the relative pivotal movement of the second mounting seat and the third mounting seat at a same time, so that relative movements of the different rods are allowed at a same time to achieve a folding operation of the entire frame body. Therefore, the present invention has advantages of simple structure and easy operation.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

In the following, the invention is further illustrated by way of example, taking reference to the accompanying drawings. Thereof FIG. 8 is a partial diagram of a first mounting seat according to the first embodiment of the present invention.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "right", "left", "front", "back", etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive. Also, the term "connect" is intended to mean either an indirect or direct mechanical connection. Thus, if a first device is coupled to a second device, that connection may be through a direct mechanical connection, or through an indirect mechanical connection via other devices and connections.

Figure 1:
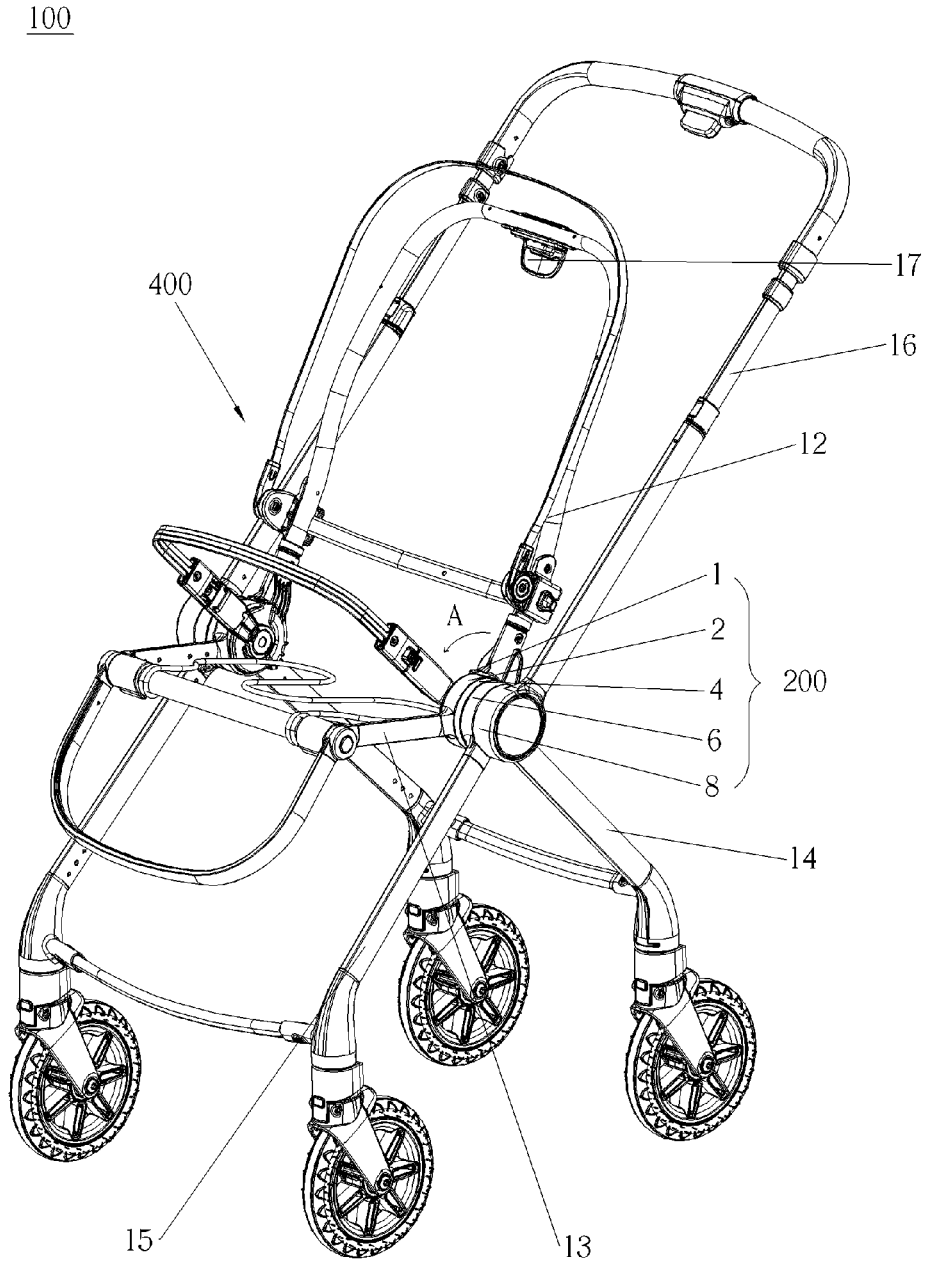
FIG. 1 is a schematic diagram of a child carrier in an unfolded state according to a first embodiment of the present invention.
Figure 2:
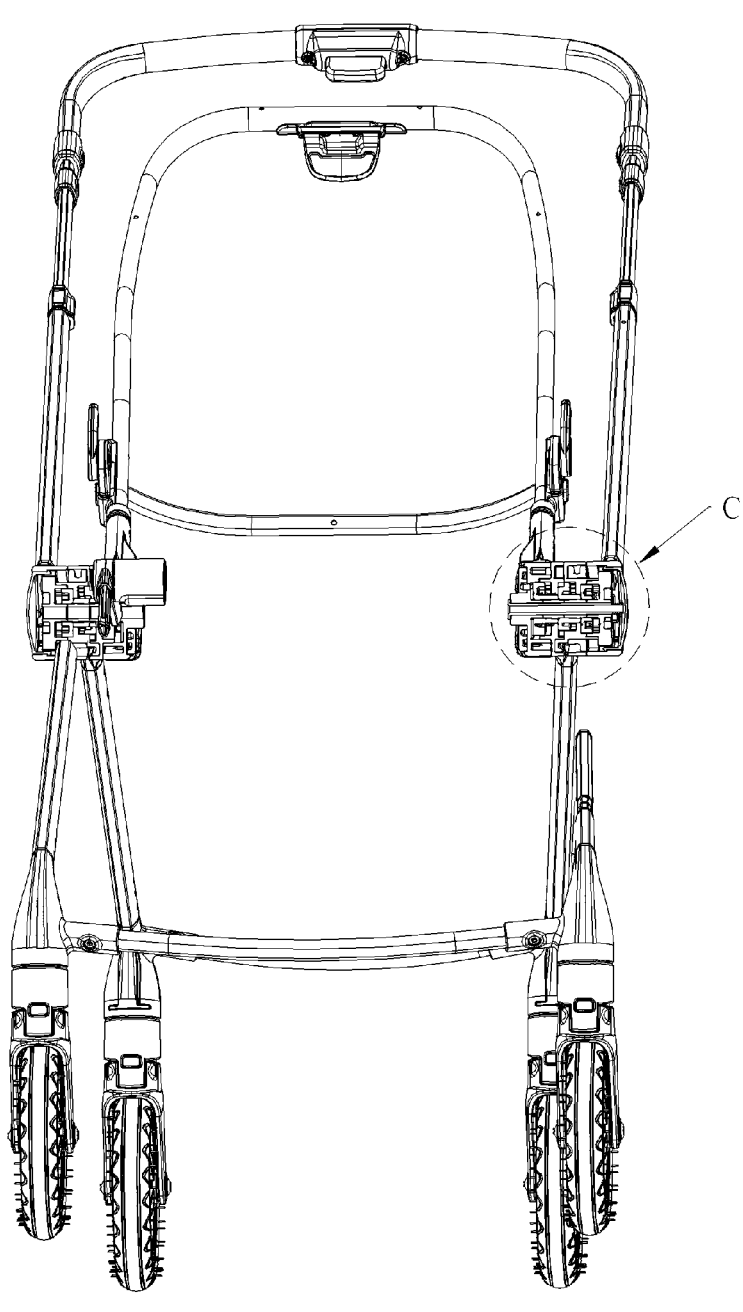
FIG. 2 is a partial sectional diagram of the child carrier according to the first embodiment of the present invention.
Figure 3:
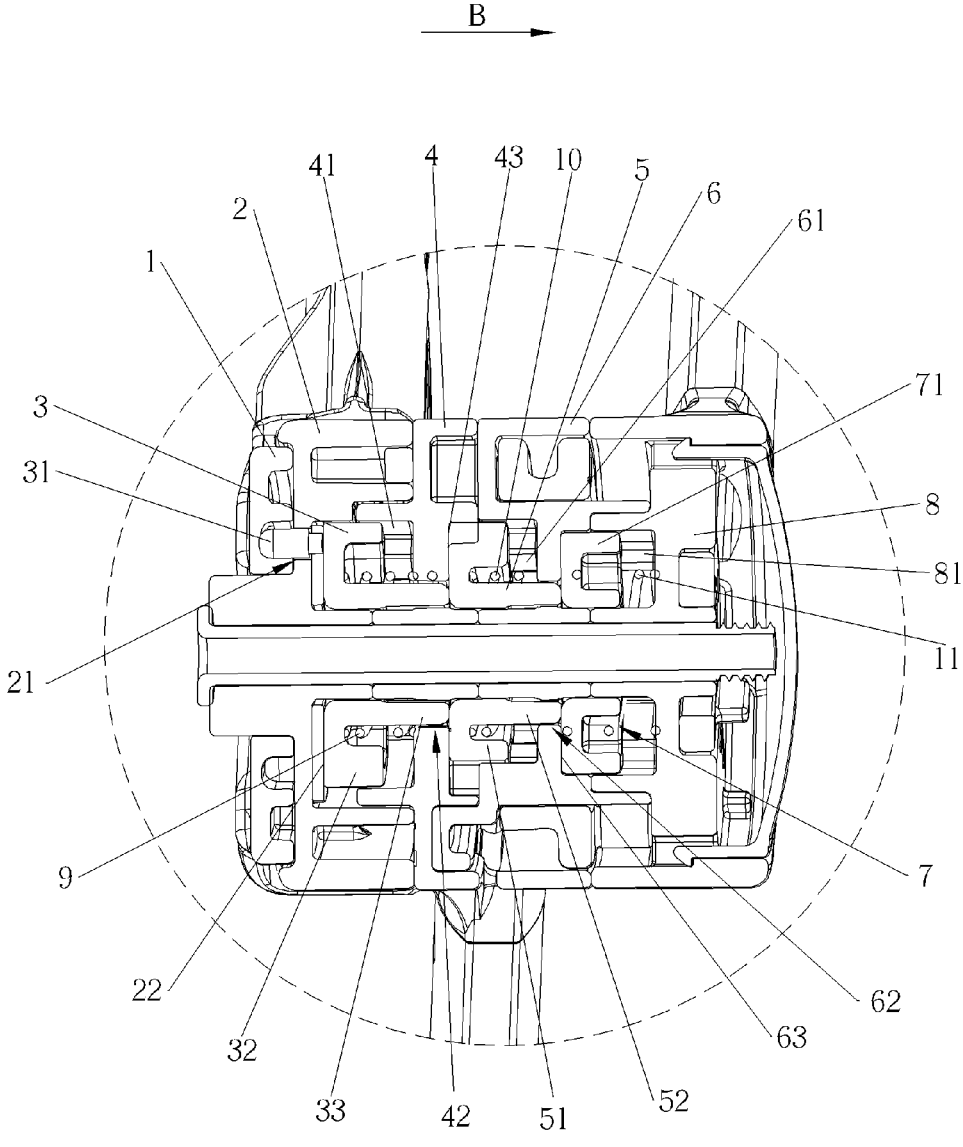
FIG. 3 is an enlarged diagram of a C portion of the child carrier shown in FIG. 2 according to the first embodiment of the present invention.
Figure 4:
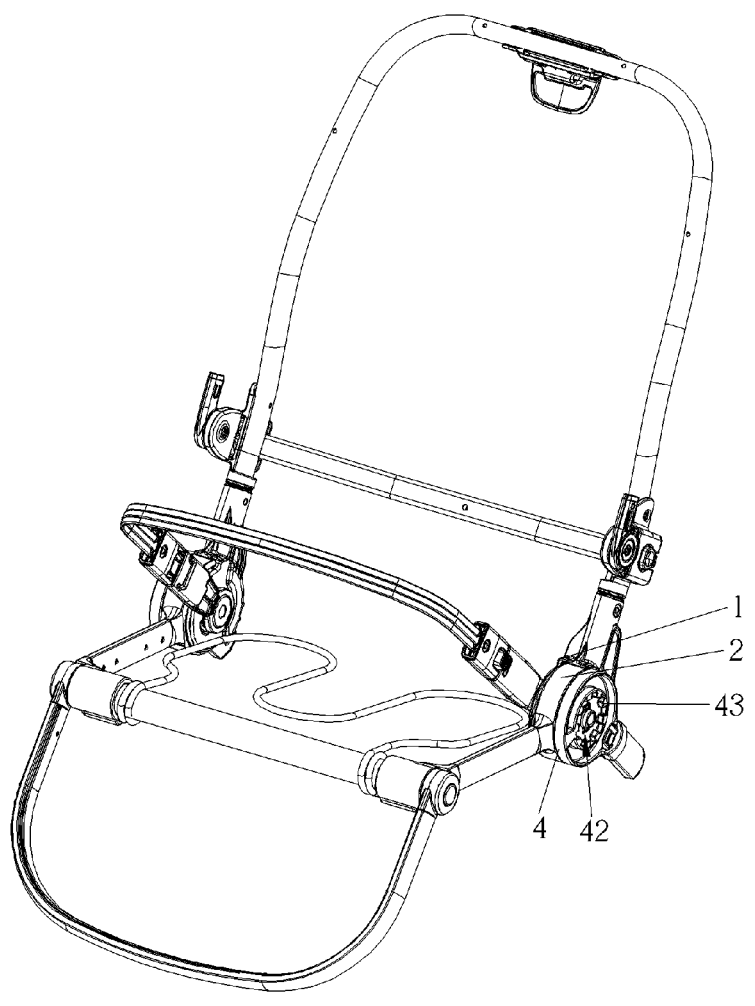
FIG. 4 and FIG. 5 are partial diagrams of the child carrier at different views according to the first embodiment of the present invention.
Figure 5:
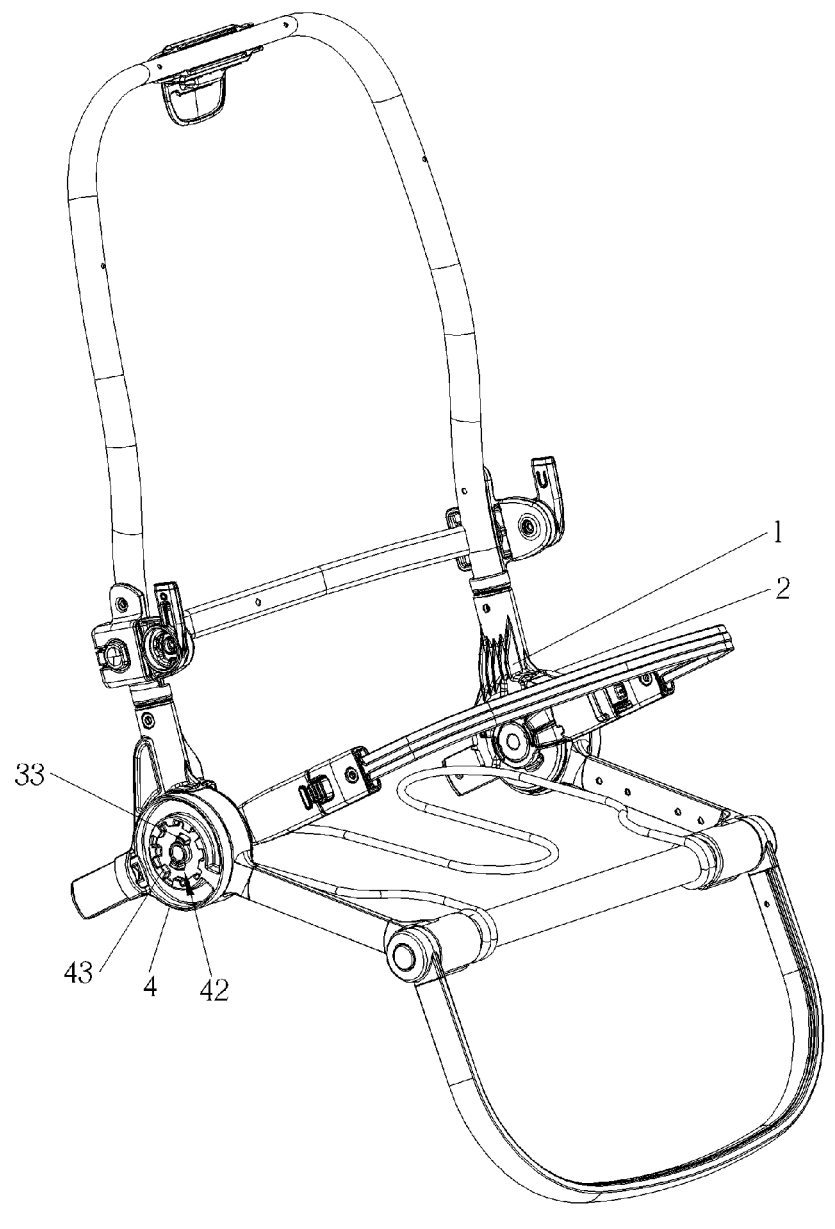

Please refer to FIG. 1 to FIG. 5. FIG. 1 is a schematic diagram of a child carrier 100 in an unfolded state according to a first embodiment of the present invention. FIG. 2 is a partial sectional diagram of the child carrier 100 according to the first embodiment of the present invention. FIG. 3 is an enlarged diagram of a C portion of the child carrier 100 shown in FIG. 2 according to the first embodiment of the present invention. FIG. 4 and FIG. 5 are partial diagrams of the child carrier 100 at different views according to the first embodiment of the present invention. As shown in FIG. 1 to FIG. 5, in this embodiment, the child carrier 100 can be a child stroller and include a frame body 400 and two foldable locking mechanisms 200. The two foldable locking mechanisms 200 are disposed on two lateral sides of the frame body 400 and symmetrical to each other for locking or unlocking different rods of the frame body 400 to allow or restrain pivotal movements of the different rods. However, the number of the foldable locking mechanism 200 is not limited to this embodiment. For example, in another embodiment, the child carrier 100 can be a child basket or a child safety seat and include only one foldable locking mechanism at one side of a frame body of the child basket or the child safety seat.

The foldable locking mechanism 200 includes a first mounting seat 1, a second mounting seat 2, a third mounting seat 4, a first locking component 3, a first resilient component 9 and a driving component 1*a*. The first mounting seat 1, the second mounting seat 2 and the third mounting seat 4 can be connected to three different rods of the frame body 400. The second mounting seat 2 is pivotally connected to the first mounting seat 1. The third mounting seat 4 is pivotally connected to the second mounting seat 2. A chamber is formed between the second mounting seat 2 and the third mounting seat 4. The first locking component 3 is at least partially and movably disposed inside the chamber between the second mounting seat 2 and the third mounting seat 4. The first locking component 3 is movable between a first releasing position and a first locking position along an axial direction of a pivoting axis of the second mounting seat 2 and the third mounting seat 4. The first locking component 3 which is located at the first locking position can lock a relative pivotal movement of the second mounting seat 2 and the third mounting seat 4, i.e., the first locking component 3 can restrain the relative pivotal movement of the second mounting seat 2 and the third mounting seat 4 when the first locking component 3 is located at the first locking position. The first locking component 3 which is located at the first releasing position can unlock the relative pivotal movement of the second mounting seat 2 and the third mounting seat 4, i.e., the first locking component 3 can allow the relative pivotal movement of the second mounting seat 2 and the third mounting seat 4 when the first locking component 3 is located at the first releasing position. The first resilient component 9 can provide a resilient force to drive the first locking component 3 to move toward the first locking position. Preferably, in this embodiment, the first resilient component 9 can be a compression spring. However, the present invention is not limited to this embodiment.

Furthermore, the driving component 1*a* is disposed on the first mounting seat 1 and abuts against the first locking component 3 for driving the first locking component 3 to move from the first locking position to the first releasing position. In this embodiment, when the first mounting seat 1 and the second mounting seat 2 pivot relative to each other, the driving component 1*a* can be driven by a relative pivotal movement of the first mounting seat 1 and the second mounting seat 2 to push the first locking component 3 from the first locking position to the first releasing position. For example, when a rod connected to the first mounting seat 1 is operated to pivotally fold relative to a rod connected to the second mounting seat 2, the first mounting seat 1 can be driven to pivotally fold relative to the second mounting seat 2. When the first mounting seat 1 pivotally folds relative to the second mounting seat 2, the driving component 1*a* can drive the first locking component 3 to move from the first locking position to the first releasing position for allowing a relative pivotal movement of the second mounting seat 2 and the third mounting seat 4, so that the rod connected to the second mounting seat 2 and a rod connected to the third mounting seat 4 can be pivotally folded relative to each other. In other words, the present invention can utilize the relative pivotal movement of the two rods connected to the first mounting seat 1 and the second mounting seat 2 to unlock a relative pivotal movement of other two rods. Therefore, the present invention has advantages of simple structure and easy operation.

Besides, as shown in FIG. 1 to FIG. 3, the foldable locking mechanism 200 further includes a fourth mounting seat 6, a fifth mounting seat 8, a second locking component 5, a third locking component 7, a second resilient component 10 and a third resilient component 11. The fourth mounting seat 6, the third locking component 7 and the fifth mounting seat 8 are sequentially disposed along a traverse direction of the foldable locking mechanism 200. Taking FIG. 3 as an example, the fourth mounting seat 6, the third locking component 7 and the fifth mounting seat 8 are sequentially disposed along an arrow direction B shown in FIG. 3. The fourth mounting seat 6 is adjacent to a side of the third mounting seat 4 away from the second mounting seat 2. The fourth mounting seat 6 is pivotally connected to the third mounting seat 4. A chamber is formed between the third mounting seat 4 and the fourth mounting seat 6. The second locking component 5 is at least partially and movably disposed inside the chamber between the third mounting seat 4 and the fourth mounting seat 6. The second locking component 5 is movable between a second releasing position and a second locking position along an axial direction of a pivoting axis of the third mounting seat 4 and the fourth mounting seat 6. The second locking component 5 which is located at the second locking position can lock a relative pivotal movement of the third mounting seat 4 and the fourth mounting seat 6, i.e., the second locking component 5 can restrain the relative pivotal movement of the third mounting seat 4 and the fourth mounting seat 6 when the second locking component 5 is located at the second locking position. The second locking component 5 which is located at the second releasing position can unlock the relative pivotal movement of the third mounting seat 4 and the fourth mounting seat 6, i.e., the second locking component 5 can allow the relative pivotal movement of the third mounting seat 4 and the fourth mounting seat 6 when the second locking component 5 is located at the second releasing position. The second resilient component 10 can provide a resilient force to drive the second locking component 5 to move toward the second locking position. Preferably, in this embodiment, the second resilient component 10 can be a compression spring. However, the present invention is not limited to this embodiment. Moreover, the second locking component 5 abuts against the first locking component 3. The first locking component 3 drives the second locking component 5 to move from the second locking position to the second releasing position when the first locking component 3 moves from the first locking position to the first releasing position.

In addition, the fifth mounting seat 8 is adjacent to a side of the fourth mounting seat 6 away from the third mounting seat 4. The fifth mounting seat 8 is pivotally connected to the fourth mounting seat 6. A chamber is formed between the fourth mounting seat 6 and the fifth mounting seat 8. The third locking component 7 is at least partially and movably disposed inside the chamber between the fourth mounting seat 6 and the fifth mounting seat 8. The third locking component 7 is movable between a third releasing position and a third locking position along an axial direction of a pivoting axis of the fourth mounting seat 6 and the fifth mounting seat 8. The third locking component 7 which is located at the third locking position can lock a relative pivotal movement of the fourth mounting seat 6 and the fifth mounting seat 8, i.e., the third locking component 7 can restrain the relative pivotal movement of the fourth mounting seat 6 and the fifth mounting seat 8 when the third locking component 7 is located at the third locking position. The third locking component 7 which is located at the third releasing position can unlock the relative pivotal movement of the fourth mounting seat 6 and the fifth mounting seat 8, i.e., the third locking component 7 can allow the relative pivotal movement of the fourth mounting seat 6 and the fifth mounting seat 8 when the third locking component 7 is located at the third releasing position. The third resilient component 11 can provide a resilient force to drive the third locking component 7 to move toward the third locking position. Preferably, in this embodiment, the third resilient component 11 can be a compression spring. However, the present invention is not limited to this embodiment. Moreover, the third locking component 7 abuts against the second locking component 5. The second locking component 5 drives the third locking component 7 to move from the third locking position to the third releasing position when the second locking component 5 moves from the second locking position to the second releasing position. In other words, in this embodiment, the relative pivotal movement of the first mounting seat 1 and the second mounting seat 2 can unlock the relative pivotal movement of the second mounting seat 2 and the third mounting seat 4, the relative pivotal movement of the third mounting seat 4 and the fourth mounting seat 6, and the relative pivotal movement of the fourth mounting seat 6 and the fifth mounting seat 8. Therefore, the present invention can provide operational convenience.

Specifically, as shown in FIG. 1 to FIG. 3, the frame body 400 includes a backrest 12, a seat 13, a rear leg 14, a front leg 15 and a handle 16 which are formed by different rods. The backrest 12 is connected to the first mounting seat 1. The seat 13 is connected to the second mounting seat 2. The rear leg 14 is connected to the third mounting seat 4. The front leg 15 is connected to the fourth mounting seat 6. The handle 16 is connected to the fifth mounting seat 8. The backrest 12 and the seat 13 can be pivotally folded or unfolded relative to each other by the relative pivotal movement of the first mounting seat 1 and the second mounting seat 2. The seat 13 and the rear leg 14 can be pivotally folded or unfolded relative to each other by the relative pivotal movement of the second mounting seat 2 and the third mounting seat 4. The rear leg 14 and the front leg 15 can be pivotally folded or unfolded relative to each other by the relative pivotal movement of the third mounting seat 4 and the fourth mounting seat 6. The front leg 15 and the handle 16 can be pivotally folded or unfolded relative to each other by the relative pivotal movement of the fourth mounting seat 6 and the fifth mounting seat 8. During a folding operation of the frame body 400, a relative pivotal movement of the backrest 12 and the seat 13 can unlock a relative pivotal movement of the seat 13 and the rear leg 14, a relative pivotal movement of the rear leg 14 and the front leg 15, and a relative pivotal movement of the front leg 15 and the handle 16 for allowing the relative pivotal movement of the seat 13 and the rear leg 14, the relative pivotal movement of the rear leg 14 and the front leg 15, and the relative pivotal movement of the front leg 15 and the handle 16 at a same time. On the other hand, during an unfolding operation of the frame body 400, the relative pivotal movement of the backrest 12 and the seat 13 can lock the relative pivotal movement of the seat 13 and the rear leg 14, the relative pivotal movement of the rear leg 14 and the front leg 15, and the relative pivotal movement of the front leg 15 and the handle 16 for restraining the relative pivotal movement of the seat 13 and the rear leg 14, the relative pivotal movement of the rear leg 14 and the front leg 15, and the relative pivotal movement of the front leg 15 and the handle 16. Therefore, the present invention has advantages of simple structure and easy operation. Moreover, preferably, the foldable locking mechanism 200 further includes a releasing operating component 17 disposed on a top portion of the backrest 12 and for unlocking the relative pivotal movement of the backrest 12 and the seat 13. Therefore, a user can unlock all of the rods of the frame body 400 without bending down.

Figure 6:
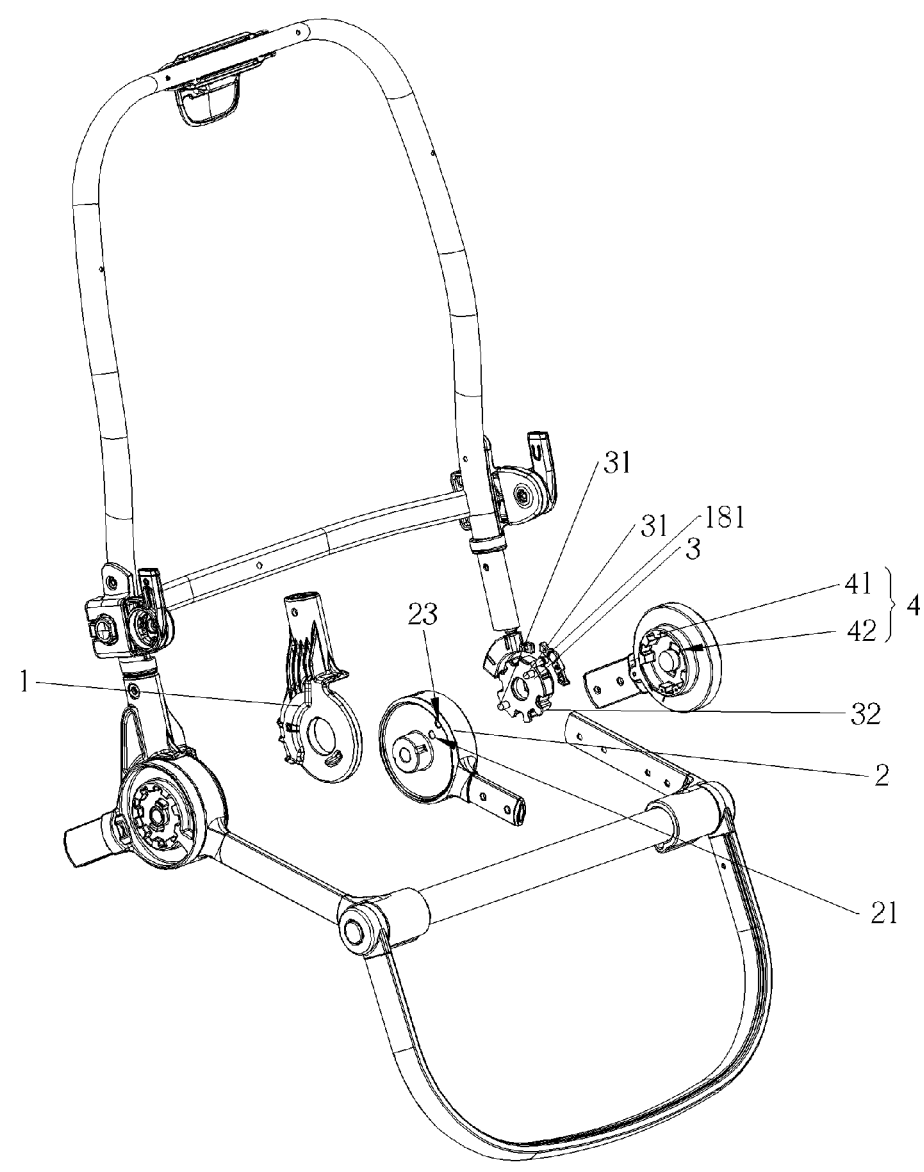
FIG. 6 and FIG. 7 are partial exploded diagrams of the child carrier at different views according to the first embodiment of the present invention.
Figure 7:
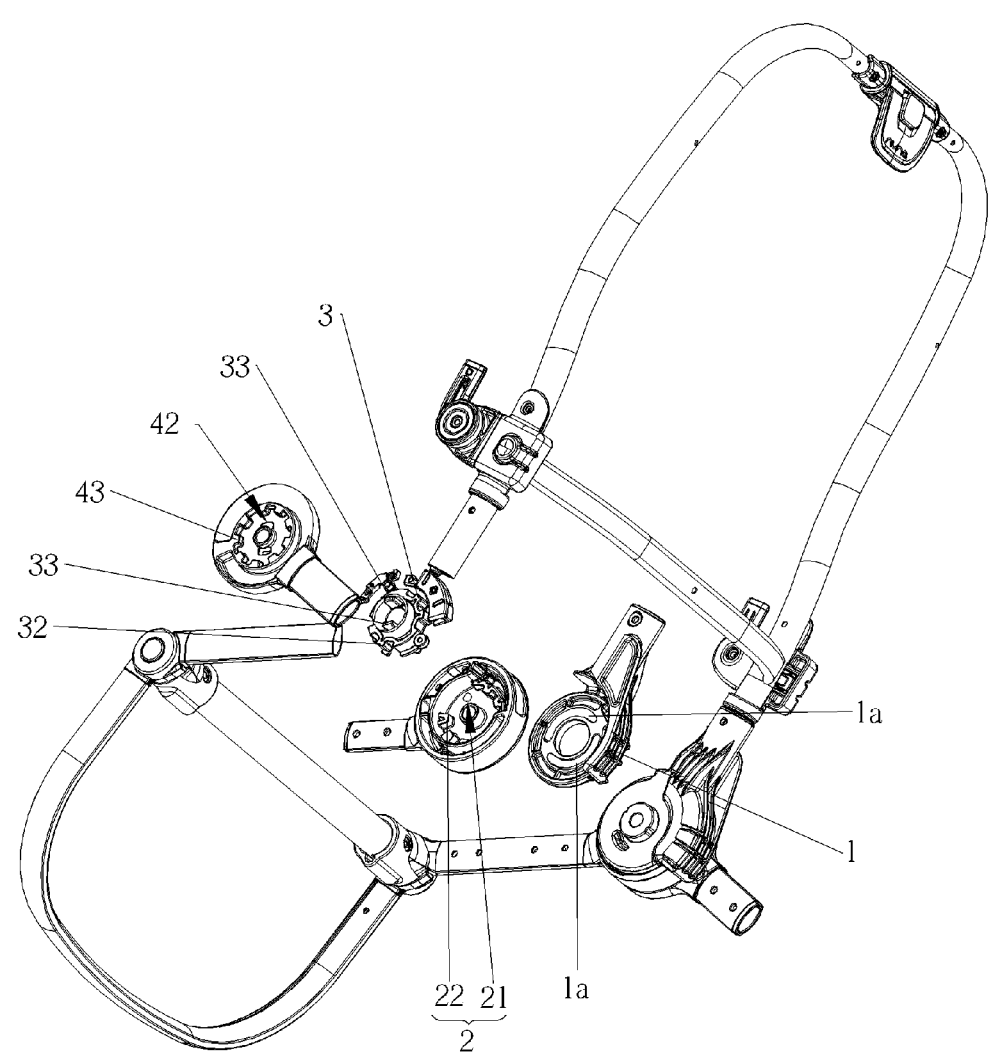
Figure 8:
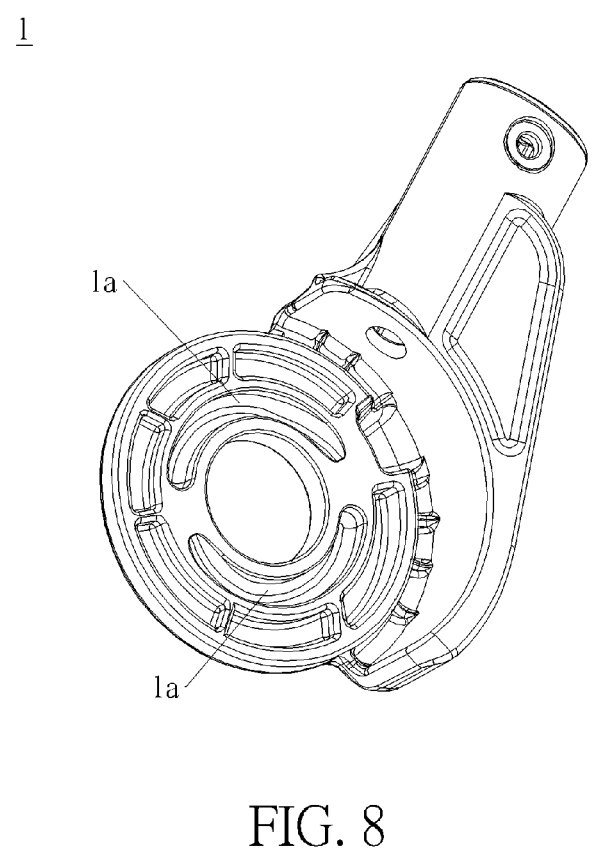

More specifically, please refer to FIG. 6 to FIG. 8. FIG. 6 and FIG. 7 are partial exploded diagrams of the child carrier 100 at different views according to the first embodiment of the present invention. FIG. 8 is a partial diagram of the first mounting seat 1 according to the first embodiment of the present invention. As shown in FIG. 6 to FIG. 8, the driving component 1a includes two pushing portions disposed on the first mounting seat 1. The two pushing portions are symmetrical to each other relative to a pivoting axis of the first mounting seat 1 and the second mounting seat 2. Each of the two pushing portions protrudes from the first mounting seat 1 toward the second mounting seat 2. The first locking component 3 includes two pushed portions 31 extending toward the two pushing portions. When the first mounting seat 1 and the second mounting seat 2 are pivotally folded relative to each other, each of the two pushing portions pushes the corresponding pushed portion 31 to drive the first locking component 3 to move from the first locking position to the first releasing position. Preferably, each of the two pushing portions can be a pushing inclined surface, and each of the two pushed portions 31 can be a protrusion cooperating with the corresponding pushing inclined surface. Each of the two pushing inclined surfaces can push the corresponding protrusion by height difference. More preferably, each of the two pushing inclined surfaces can be helical, and a central axis of each of the two pushing inclined surfaces can be coincided with the pivoting axis of the first mounting seat 1 and the second mounting seat 2. Furthermore, each of the two protrusions can be formed in a shape of a circular column. However, the structures of the driving component and the first locking component are not limited to this embodiment. Besides, two through holes 21 are formed on the second mounting seat 4 and located at positions corresponding to the two pushed portions 31 respectively. Each of the two pushed portions 31 slidably passes through the corresponding through hole 21 to allow the first locking component 3 to stretch into a chamber between the first mounting seat 1 and the second mounting seat 2 to achieve a purpose of driving the first locking component 3 by the driving component 1a when the first mounting seat 1 and the second mounting seat 2 pivot relative to each other. In this embodiment, the driving component 1a includes the two pushing portions symmetrical to each other relative to the pivoting axis of the first mounting seat 1 and the second mounting seat 2, and the first locking component 3 includes the two pushed portions 31. Therefore, the driving component 1a can push the first locking component 3 stably for ensuring a smooth movement of the first locking component 3. However, the numbers of the pushing portion and the pushed portion are not limited to this embodiment. For example, in another embodiment, the driving component can include only one pushing portion, and the first locking component can include only one pushed portion.

Besides, as shown in FIG. 6 to FIG. 8, the first locking component 3 further includes a first engaging tooth 32. The second mounting seat 2 includes a first left engaged tooth 22 cooperating with the first engaging tooth 32. The third mounting seat 4 includes a first right engaged tooth 41 cooperating with the first engaging tooth 32. When the first locking component 3 is located at the first locking position, the first engaging tooth 32 engages with the first left engaged tooth 22 and the first right engaged tooth 41, so that the relative pivotal movement of the second mounting seat 2 and the third mounting seat 4 is restrained. At this moment, since the relative pivotal movement of the second mounting seat 2 and the third mounting seat 4 is restrained, the relative pivotal movement of the seat 13 and the rear leg 14 is also restrained. When the first locking component 3 is located at the first releasing position, the first engaging tooth 32 engages with the first right engaged tooth 41 but disengages from the first left engaged tooth 22, so as to allow the relative pivotal movement of the second mounting seat 2 and the third mounting seat 4. At this moment, since the relative pivotal movement of the second mounting seat 2 and the third mounting seat 4 is allowed, the relative pivotal movement of the seat 13 and the rear leg 14 is also allowed.

As shown in FIG. 3 and FIG. 6 to FIG. 8, the first locking component 3 includes a first abutting portion 33 extending toward the second locking component 5. The first abutting portion 33 passes through the third mounting seat 4 to abut against the second locking component 5. Specifically, the first abutting portion 33 can be a protruding block extending toward the second locking component 5. Preferably, in this embodiment, a cross section of the first locking component 3 can be formed in a shape of two L-shaped structures back to back. However, the present invention is not limited to this embodiment. A penetrating hole 42 is formed on the third mounting seat 4 and located at a position corresponding to the first abutting portion 33. The first abutting portion 33 slidably passes through the penetrating hole 42 to resiliently abut against the second locking component 5.

As shown in FIG. 3 and FIG. 6 to FIG. 8, the second locking component 5 includes a second engaging tooth 51. The third mounting seat 4 includes a second left engaged tooth 43 cooperating with the second engaging tooth 51. The fourth mounting seat 6 includes a second right engaged tooth 61 cooperating with the second engaging tooth 51. When the second locking component 5 is located at the second locking position, the second engaging tooth 51 engages with the second left engaged tooth 43 and the second right engaged tooth 61, so that the relative pivotal movement of the third mounting seat 4 and the fourth mounting seat 6 is restrained. At this moment, since the relative pivotal movement of the third mounting seat 4 and the fourth mounting seat 6 is restrained, the relative pivotal movement of the rear leg 14 and the front leg 15 is also restrained. When the second locking component 5 is located at the second releasing position, the second engaging tooth 51 engages with the second right engaged tooth 61 but disengages from the second left engaged tooth 43, so as to allow the relative pivotal movement of the third mounting seat 4 and the fourth mounting seat 6. At this moment, since the relative pivotal movement of the third mounting seat 4 and the fourth mounting seat 6 is allowed, the relative pivotal movement of the rear leg 14 and the front leg 15 is also allowed.

As shown in FIG. 1 to FIG. 3, the third locking component 7 includes a second abutting portion 52 extending toward the third locking component 7. The second abutting portion 52 passes through the fourth mounting seat 6 to abut against the third locking component 7. Specifically, the second abutting portion 52 can be a protruding block extending toward the third locking component 7. Preferably, in this embodiment, a cross section of the third locking component 7 can be formed in a shape of two L-shaped structures back to back. However, the present invention is not limited to this embodiment. A penetrating hole 62 is formed on the fourth mounting seat 6 and located at a position corresponding to the second abutting portion 52. The second abutting portion 52 slidably passes through the penetrating hole 62 to resiliently abut against the third locking component 7.

As shown in FIG. 3 and FIG. 6 to FIG. 8, the third locking component 7 includes a third engaging tooth 71. The fourth mounting seat 6 includes a third left engaged tooth 63 cooperating with the third engaging tooth 71. The fifth mounting seat 8 includes a third right engaged tooth 81 cooperating with the third engaging tooth 71. When the third locking component 7 is located at the first locking position, the third engaging tooth 71 engages with the third left engaged tooth 63 and the third right engaged tooth 81, so that the relative pivotal movement of the fourth mounting seat 6 and the fifth mounting seat 8 is restrained. At this moment, since the relative pivotal movement of the fourth mounting seat 6 and the fifth mounting seat 8 is restrained, the relative pivotal movement of the front leg 15 and the handle 16 is also restrained. When the third locking component 7 is located at the first releasing position, the third engaging tooth 71 engages with the third right engaged tooth 81 but disengages from the third left engaged tooth 63, so as to allow the relative pivotal movement of the fourth mounting seat 6 and the fifth mounting seat 8. At this moment, since the relative pivotal movement of the fourth mounting seat 6 and the fifth mounting seat 8 is allowed, the relative pivotal movement of the front leg 15 and the handle 16 is also allowed.

Figure 9:
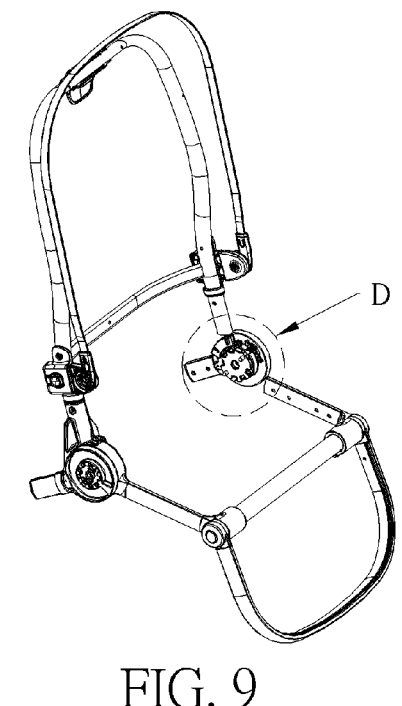
FIG. 9 is a partial internal structural diagram of the child carrier according to the first embodiment of the present invention.
Figure 10:
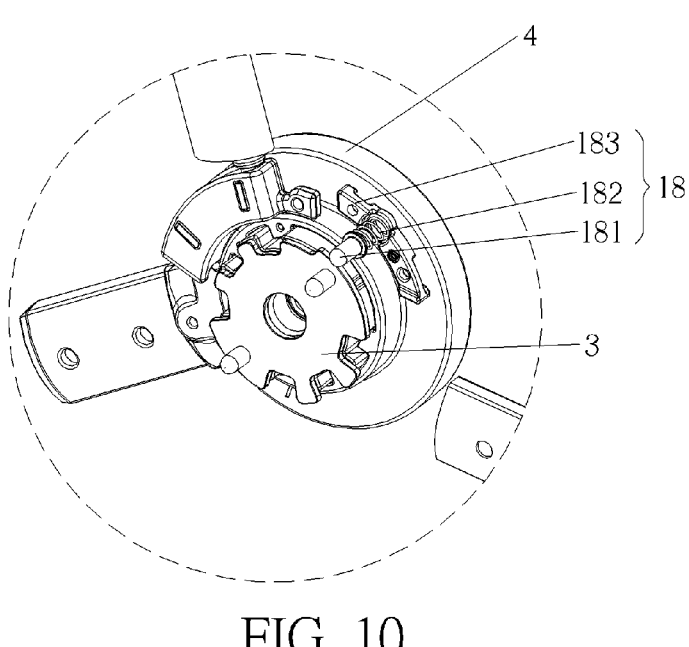
FIG. 10 is an enlarged diagram of a D portion of the child carrier shown in FIG. 9 according to the first embodiment of the present invention.
Figure 11:
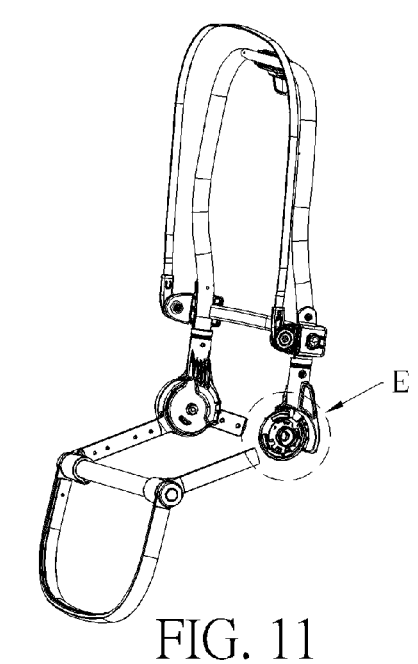
FIG. 11 is another partial internal structural diagram of the child carrier according to the first embodiment of the present invention.
Figure 12:
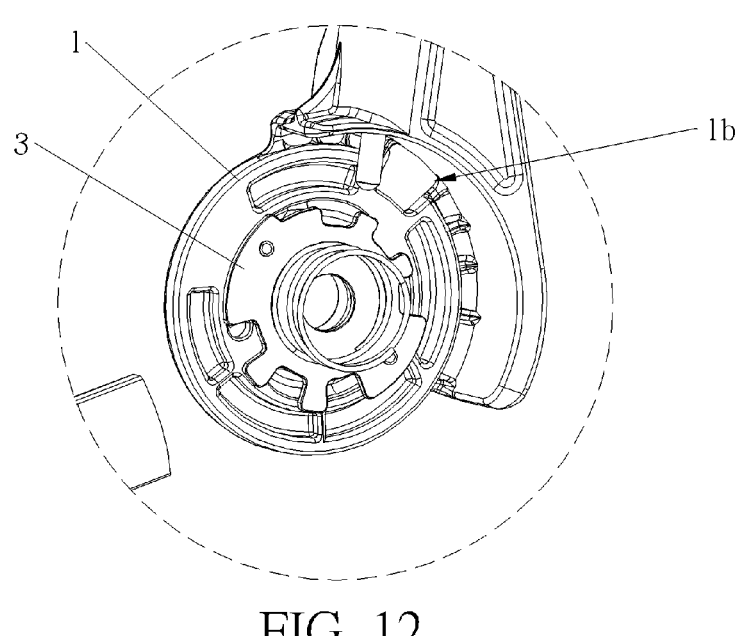
FIG. 12 is an enlarged diagram of an E portion of the child carrier shown in FIG. 11 according to the first embodiment of the present invention.
Figure 13:
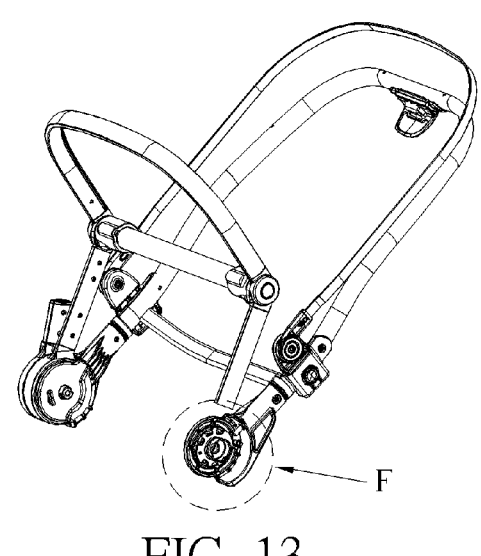
FIG. 13 is a partial diagram of the child carrier as a limiting component stretches into a limiting slot according to the first embodiment of the present invention.
Figure 14:
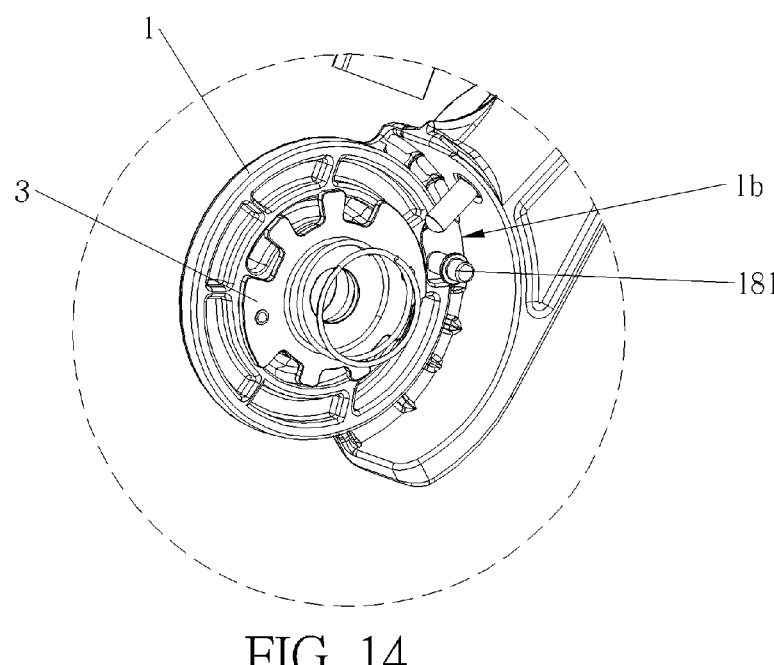
FIG. 14 is an enlarged diagram of an F portion of the child carrier shown in FIG. 13 according to the first embodiment of the present invention.

Please refer to FIG. 6 and FIG. 9 to FIG. 14. FIG. 9 is a partial internal structural diagram of the child carrier 100 according to the first embodiment of the present invention. FIG. 10 is an enlarged diagram of a D portion of the child carrier 100 shown in FIG. 9 according to the first embodiment of the present invention. FIG. 11 is another partial internal structural diagram of the child carrier 100 according to the first embodiment of the present invention. FIG. 12 is an enlarged diagram of an E portion of the child carrier 100 shown in FIG. 11 according to the first embodiment of the present invention. FIG. 13 is a partial diagram of the child carrier 100 as a limiting component 181 stretches into a limiting slot 1b according to the first embodiment of the present invention. FIG. 14 is an enlarged diagram of an F portion of the child carrier 100 shown in FIG. 13 according to the first embodiment of the present invention. As shown in FIG. 6 and FIG. 9 to FIG. 14, the foldable locking mechanism 200 further includes a limiting assembly 18 configured to limit a relative pivotal angle of the first mounting seat 1 and the second mounting seat 2. The limiting assembly 18 includes the limiting component 181, a fourth resilient component 182 and a limiting connecting component 183. The limiting component 181 is installed on the second mounting seat 2 and protrudes toward the first mounting seat 1. The limiting slot 1b is formed on the first mounting seat 1 and located at a position corresponding to the limiting component 181. The limiting component 181 slidably stretches into the limiting slot 1b. By a cooperation of the limiting component 181 and the limiting slot 1b, the limiting assembly 18 can limit the relative pivotal angle of the first mounting seat 1 and the second mounting seat 2 for preventing an excessive relative pivotal angle of the first mounting seat 1 and the second mounting seat 2. For example, the limiting component 181 can be configured to slidably stretch into the limiting slot 1*b* when the child carrier 100 is in the folded state, so as to prevent an excessive folding operation of the child carrier 100. Specifically, the limiting connecting component 183 is fixed on the second mounting seat 2. Two ends of the fourth resilient component 182 can be connected to the limiting connecting component 183 and the limiting component 181 respectively. The limiting component 181 is installed on the second mounting seat 2 by the fourth resilient component 182 and the limiting connecting component 183, so that the limiting component 181 can resiliently abut against the limiting slot 1*b* for preventing wear or damage of components due to collision. Preferably, in this embodiment, the limiting component 181 can be a circular column, so as to achieve a smoother sliding movement of the limiting component 181. However, the present invention is not limited to this embodiment. Besides, a passing hole 23 is formed on the second mounting seat 2 and located at a position corresponding to the limiting component 181. The limiting component 181 slidably passes through the passing hole 23 to resiliently abut against the limiting slot 1*b*.

As shown in FIG. 1 to FIG. 14, operational principle of the foldable locking mechanism 200 is provided as follows. When it is desired to fold the frame body 400 of the child carrier 100, the user can press the releasing operating component 17 to unlock the relative pivotal movement of the backrest 12 and the seat 13, and then operate the backrest 12 to drive the backrest 12 to pivotally fold relative to the seat 13 along an arrow direction A shown in FIG. 1 to drive the first mounting seat 1 to pivotally fold relative to the second mounting seat 2 along the arrow direction A. When the first mounting seat 1 pivotally folds relative to the second mounting seat 2 along the arrow direction A, the pushing portions of the driving component 1*a* can push the pushed portions 31 of the first locking component 3 to drive the first locking component 3 to move from the first locking position to the first releasing position along the arrow direction B shown in FIG. 3 by overcoming the resilient force generated by the first resilient component 9. Since, the first locking component 3 abuts against the second locking component 5, and the second locking component 5 abuts against the third locking component 7, the second locking component 5 and the third locking component 7 can be driven to move from the second locking position and the third locking position to the second releasing position and the third releasing position respectively, to unlock the relative pivotal movement of the seat 13 and the rear leg 14, the relative pivotal movement of the rear leg 14 and the front leg 15 and the relative pivotal movement of the front leg 15 and the handle 16 when the first locking component 3 moves from the first locking position to the first releasing position. Afterwards, the user can operate the seat 13, the rear leg 14, the front leg 15 and the handle 16 to complete the folding operation of the frame body 400 of the child carrier 100 by the relative pivotal movement of the seat 13 and the rear leg 14, the relative pivotal movement of the rear leg 14 and the front leg 15 and the relative pivotal movement of the front leg 15 and the handle 16.

On the other hand, when it is desired to unfold the frame body 400 of the child carrier 100, the user can operate the backrest 12 to drive the backrest 12 to pivotally unfold relative to the seat 13 along a direction opposite to the arrow direction A to drive the first mounting seat 1 to pivotally unfold relative to the second mounting seat 2 along the direction opposite to the arrow direction A. When the first mounting seat 1 pivotally unfolds relative to the second mounting seat 2 along the direction opposite to the arrow direction A, the pushing portions of the driving component 1*a* do not push the pushed portions 31 of the first locking component 3 along the arrow direction B. Therefore, the resiliently deformed first resilient component 9 can drive the first locking component 3 to move from the first releasing position to the first locking position along a direction opposite to the arrow direction B. When the first locking component 3 moves from the first releasing position to the first locking position, the first locking component 3 does not push the second locking component 5 along the arrow direction B. Therefore, the resiliently deformed second resilient component 10 can drive the second locking component 5 to move from the second releasing position to the second locking position along the direction opposite to the arrow direction B. When the second locking component 5 moves from the second releasing position to the second locking position, the second locking component 5 does not push the third locking component 7 along the arrow direction B. Therefore, the resiliently deformed third resilient component 11 can drive the third locking component 7 to move from the third releasing position to the third locking position along the direction opposite to the arrow direction B. The first locking component 3 located at the first locking position, the second locking component 5 located at the second locking position, and the third locking component 7 located at the third locking position can respectively lock the relative pivotal movement of the seat 13 and the rear leg 14, the relative pivotal movement of the rear leg 14 and the front leg 15 and the relative pivotal movement of the front leg 15 and the handle 16, so that the frame body 400 can be locked in the unfolded state.

Figure 15:
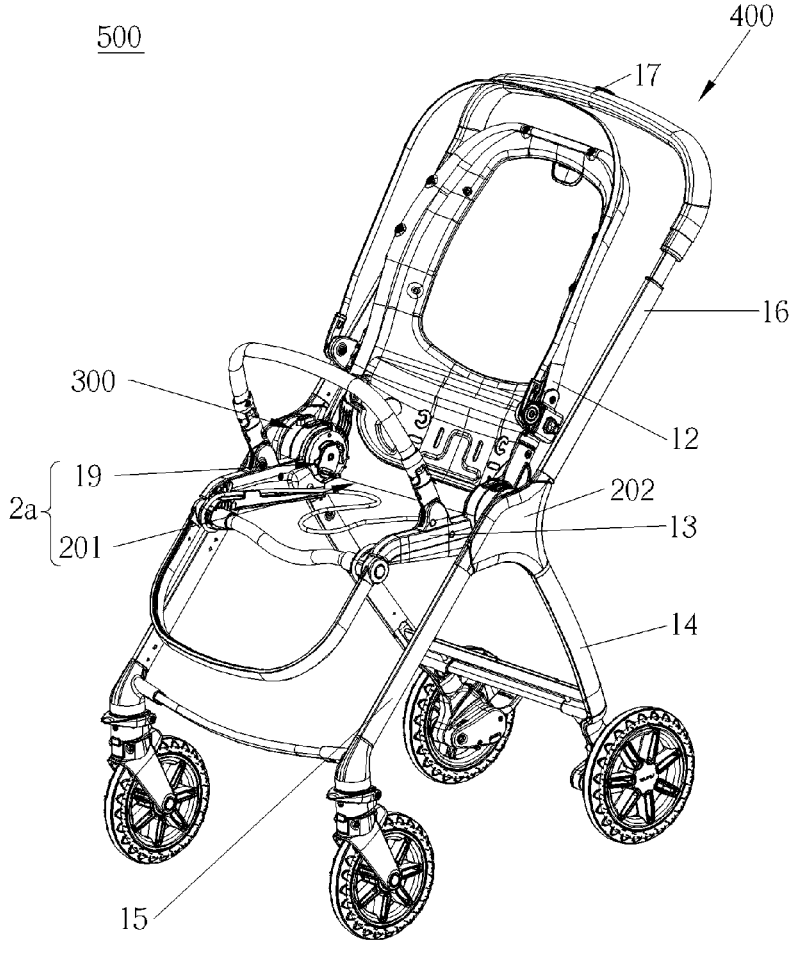
FIG. 15 is a schematic diagram of a child carrier in an unfolded state according to a second embodiment of the present invention.
Figure 16:
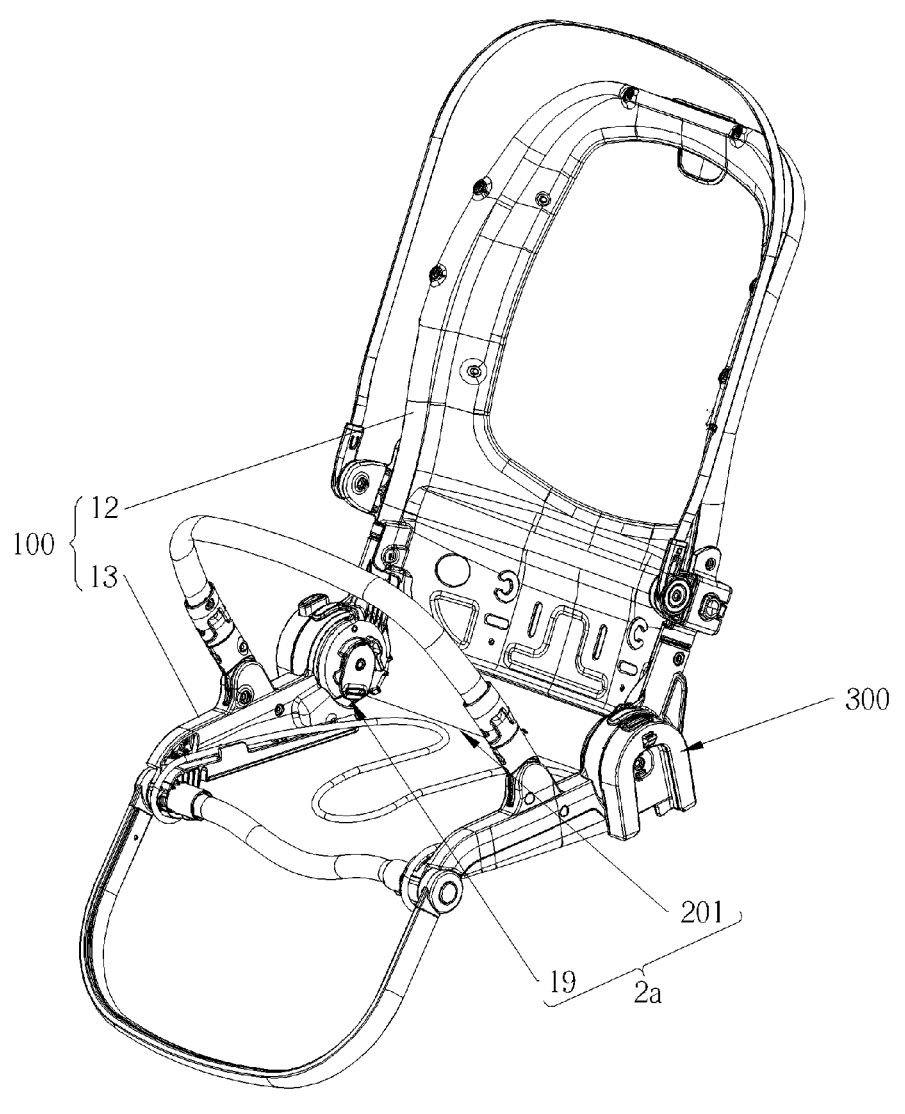
FIG. 16 is a partial diagram of the child carrier according to the second embodiment of the present invention.
Figure 17:
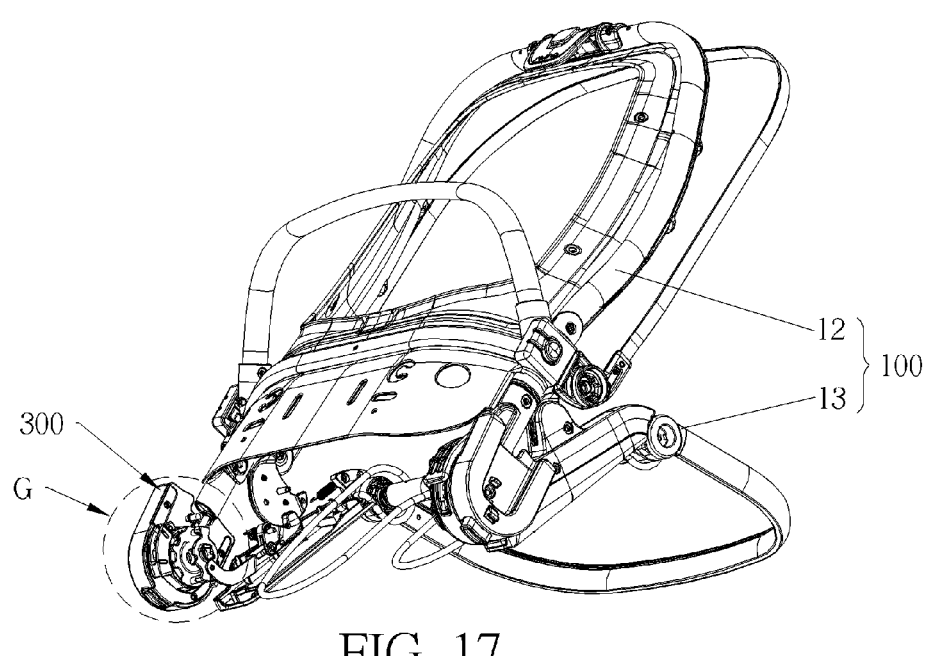
FIG. 17 is another partial diagram of the child carrier according to the second embodiment of the present invention.
Figure 18:
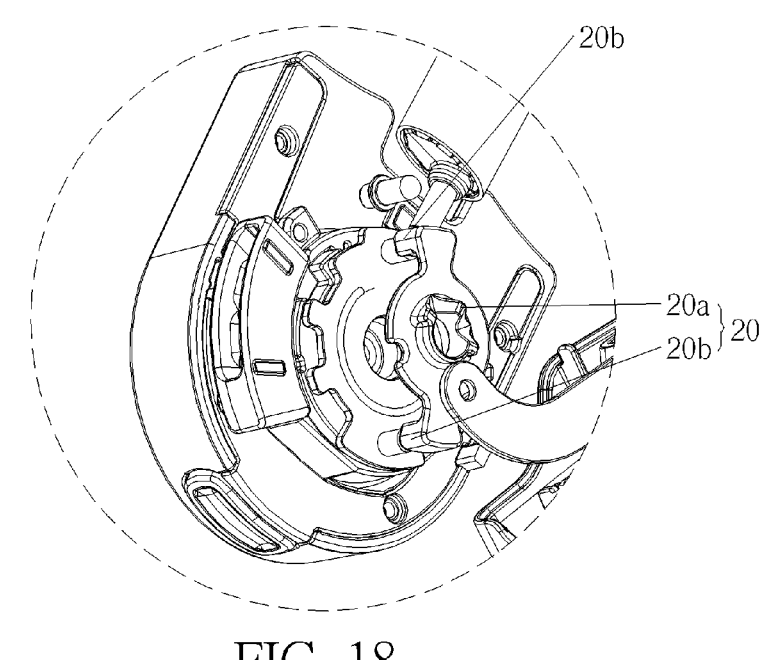
FIG. 18 is an enlarged diagram of a G portion of the child carrier shown in FIG. 17 according to the second embodiment of the present invention.
Figure 19:
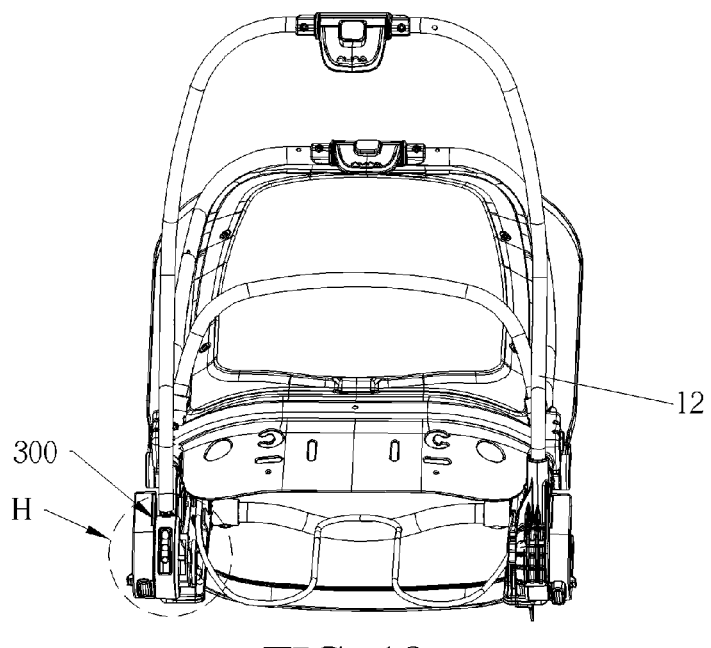
FIG. 19 is a partial internal structural diagram of the child carrier according to the second embodiment of the present invention.
Figure 20:
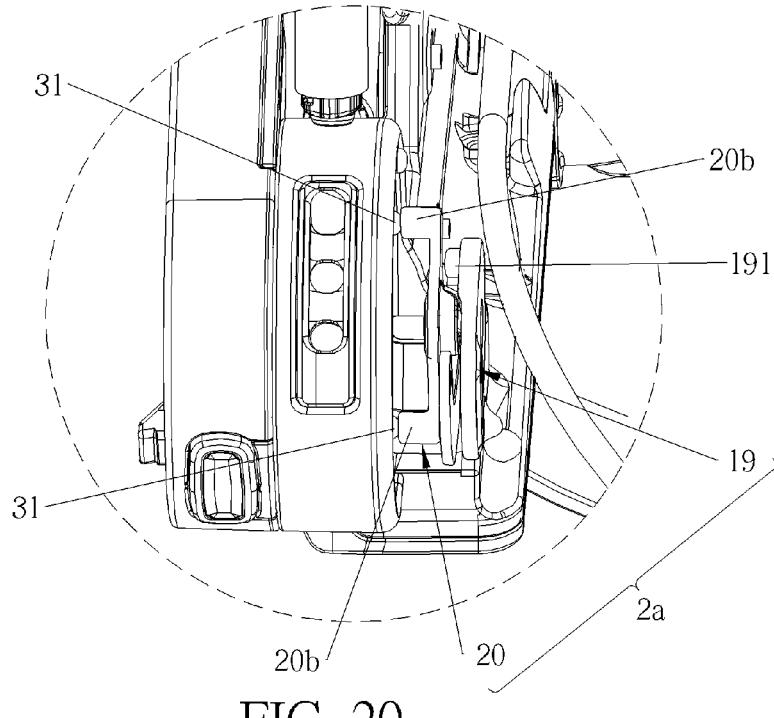
FIG. 20 is an enlarged diagram of an H portion of the child carrier shown in FIG. 19 according to the second embodiment of the present invention.
Figure 21:
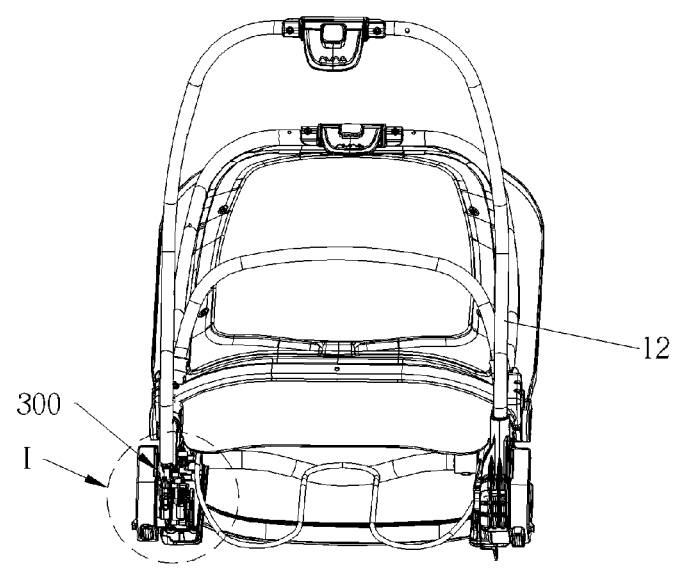
FIG. 21 is another partial internal structural diagram of the child carrier according to the second embodiment of the present invention.
Figure 22:
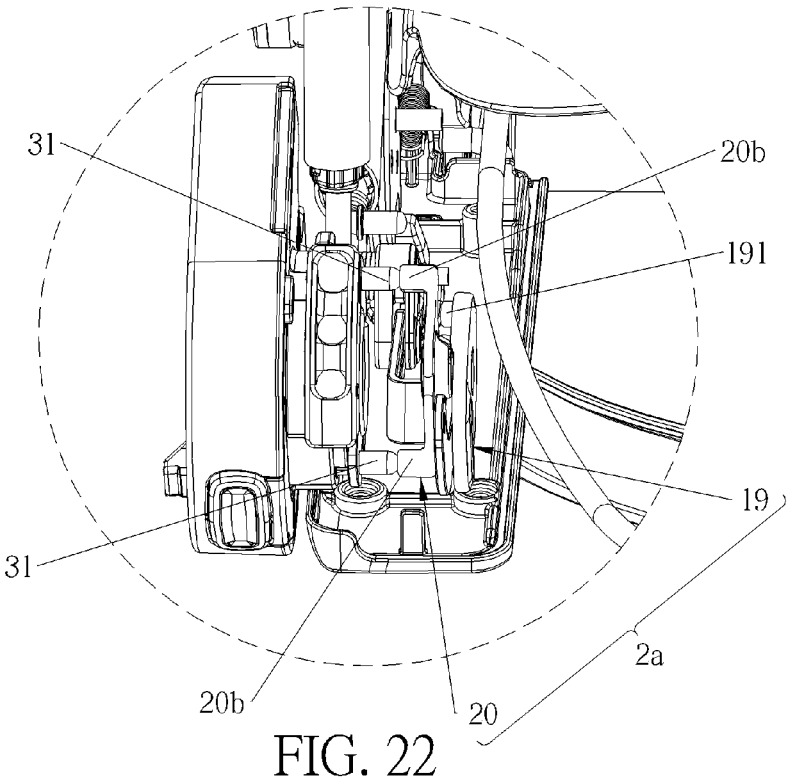
FIG. 22 is an enlarged diagram of an I portion of the child carrier according to the second embodiment of the present invention.
Figure 23:
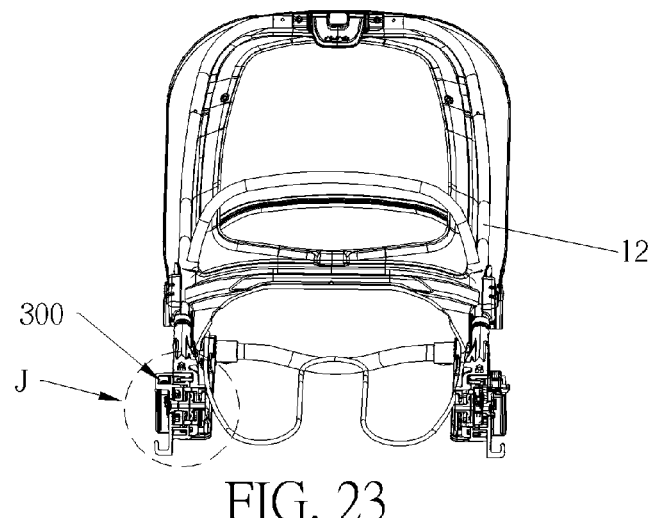
FIG. 23 is a partial sectional diagram of the child carrier according to the second embodiment of the present invention.
Figure 24:
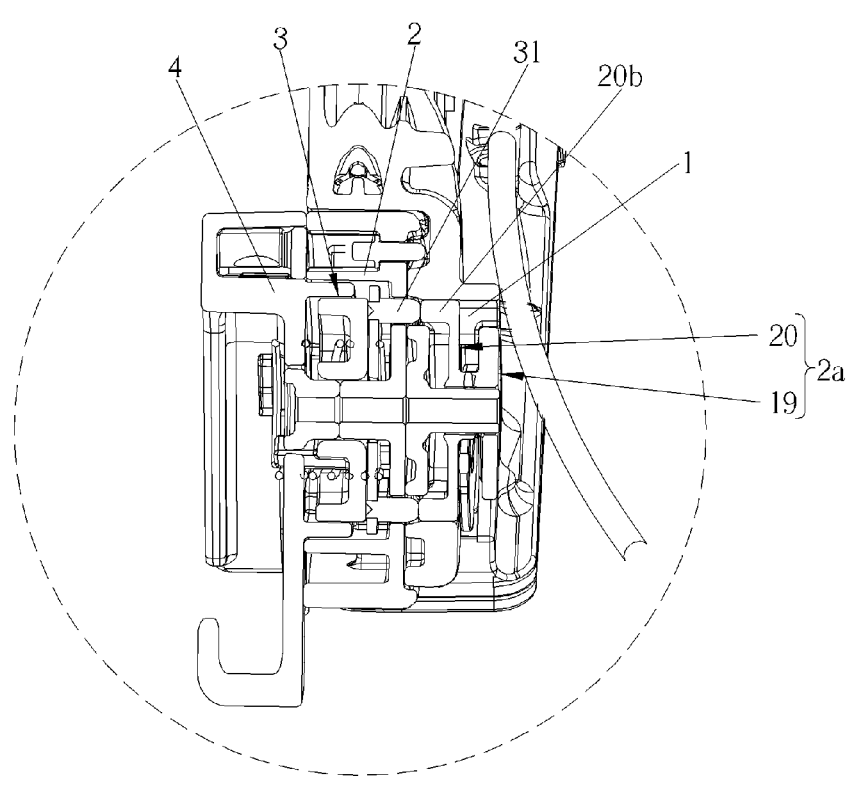
FIG. 24 is an enlarged diagram of a J portion of the child carrier according to the second embodiment of the present invention.
Figure 25:
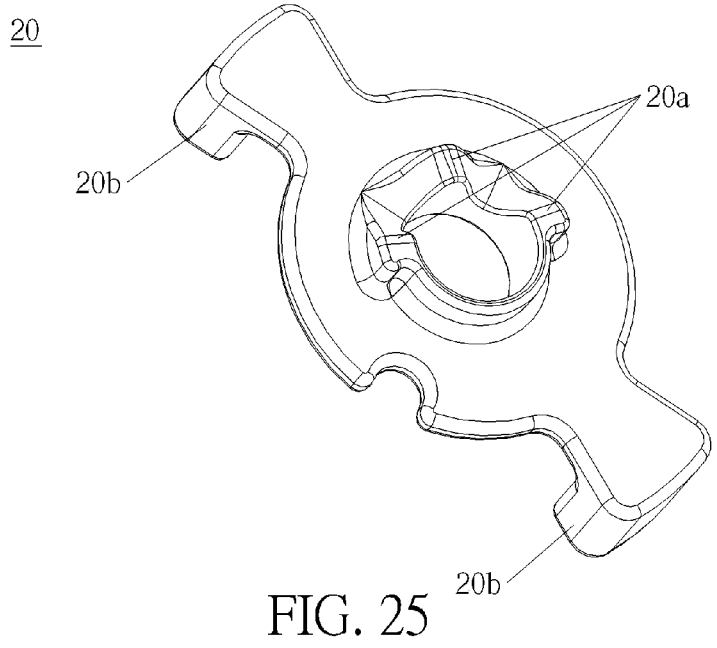
FIG. 25 is a diagram of a driven component according to the second embodiment of the present invention.
Figure 26:
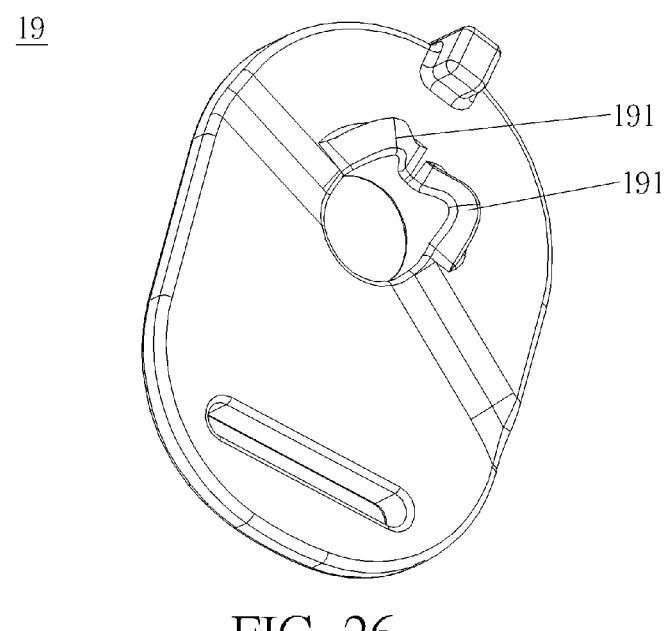
FIG. 26 is a diagram of a pushing component according to the second embodiment of the present invention.

Please further refer to FIG. 15 to FIG. 26. FIG. 15 is a schematic diagram of a child carrier 500 in an unfolded state according to a second embodiment of the present invention. FIG. 16 is a partial diagram of the child carrier 500 according to the second embodiment of the present invention. FIG. 17 is another partial diagram of the child carrier 500 according to the second embodiment of the present invention. FIG. 18 is an enlarged diagram of a G portion of the child carrier 500 shown in FIG. 17 according to the second embodiment of the present invention. FIG. 19 is a partial internal structural diagram of the child carrier 500 according to the second embodiment of the present invention. FIG. 20 is an enlarged diagram of an H portion of the child carrier 500 shown in FIG. 19 according to the second embodiment of the present invention. FIG. 21 is another partial internal structural diagram of the child carrier 500 according to the second embodiment of the present invention. FIG. 22 is an enlarged diagram of an I portion of the child carrier 500 according to the second embodiment of the present invention. FIG. 23 is a partial sectional diagram of the child carrier 500 according to the second embodiment of the present invention. FIG. 24 is an enlarged diagram of a J portion of the child carrier 500 according to the second embodiment of the present invention. FIG. 25 is a diagram of a driven component 20 according to the second embodiment of the present invention. FIG. 26 is a diagram of a pushing component 19 according to the second embodiment of the present invention. As shown in FIG. 15 to FIG. 26, the child carrier 500 includes two foldable locking mechanisms 300 and the frame body 400. Structure of the foldable locking mechanism 300 of this embodiment is similar to structure of the foldable locking mechanism 200 of the first embodiment. Different from the first embodiment, the foldable locking mechanism 300 of this embodiment further includes a shell 202 configured to accommodate the fourth mounting seat, the fifth mounting seat and the third locking component. The third mounting seat 4 can be detached from the fourth mounting seat. FIG. 15 to FIG. 26 only illustrate a part of the structure of the foldable locking mechanism 300 without illustrating the fourth mounting seat, the fifth mounting seat, the second locking component, the third locking component and the limiting assembly. Structures of the fourth mounting seat, the fifth mounting seat, the second locking component, the third locking component and the limiting assembly of this embodiment are similar to the ones of the fourth mounting seat 6, the fifth mounting seat 8, the second locking component 5, the third locking component 7 and the limiting assembly 18 of the first embodiment. Detailed description is omitted herein for simplicity.

Besides, each of the two foldable locking mechanisms 300 of this embodiment includes a driving component 2*a*. The driving component 2*a* includes the pushing component 19, the driven component 20 and a linking component 201. The pushing component 19 is pivotally connected to the first mounting seat 1. A pivoting axis of the pushing component 19 is coincided with the pivoting axis of the first mounting seat 1 and the second mounting seat 2. The driven component 20 is movably disposed between the pushing component 19 and the third locking component 3 and movable between an extending position and a retracting position. Preferably, the pivoting axis of the pushing component 19 passes through a center of the driven component 20. The driven component 20 is movable along an axial direction of the pivoting axis of the first mounting seat 1 and the second mounting seat 2. The linking component 201 is connected to the pushing component 19, so that the pushing component 19 can be driven by the linking component 201 to pivot relative to the first mounting seat 1 to drive the driven component 20 to move from the retracting position to the extending position for driving the first locking component 3 to move from the first locking position to the first releasing position. Understandably, in this embodiment, the two foldable locking mechanisms 300 are symmetrically disposed on the two lateral sides of the frame body 400. The two linking components 201 connected to the two pushing components 19 can be connected to each other to form a one-piece linking structure connected to the two pushing components 19.

As shown in FIG. 17 to FIG. 26, the pushing component 19 includes three adjoining portions 191 adjacently disposed and extending toward the driven component 20. The driven component 20 includes two adjoined portions 20*a* adjacently disposed and cooperating with the three adjoining portions 191. Each of the three adjoining portions 191 is for pushing the corresponding adjoined portion 20*a* to drive the driven component 20 to move from the retracting position to the extending position for achieving a purpose of driving the driven component 20 to move by the pushing component 19. Each of the three adjoining portions 191 can be an adjoining protrusion. Each of the two adjoined portions 20*a* can be an adjoined protrusion. When the driven component 20 is located at the retracting position, the two adjoined protrusions and the three adjoining protrusions are misaligned from each other, i.e., each of the two adjoined protrusions is located in a recess between the two corresponding adjoining portions 191. When the driven component 20 is located at the extending position, the two adjoined protrusions and the two corresponding adjoining protrusions are aligned with and abutted against each other. In other words, when the pushing component 19 pivots relative to the first mounting seat 1 to drive the two adjoined protrusions and the two corresponding adjoining protrusions to be aligned with and abutted against each other, the driven component 20 can be driven by the pushing component 19 to move from the retracting position to the extending position. When the pushing component 19 pivots relative to the first mounting seat 1 to drive each of the two adjoined protrusions to move in the recess between the two corresponding adjoining portions 191, the pushing component 19 does not push the driven component 20, so that the driven component 20 can be driven by the first locking component 3 to move from the extending position to the retracting position. Preferably, each of the three adjoining protrusions and each of the two adjoined protrusions can be arc-shaped structures. However, the numbers of the adjoining portion and the adjoined portion are not limited to this embodiment. For example, in another embodiment, the pushing component can include only one adjoining portion, and the driven component can include only one adjoined portion.

As shown in FIG. 17 to FIG. 26, the driven component 20 includes two pushing abutting portions 20*b* oppositely disposed and extending toward the first locking component 3. The first locking component 3 includes two pushed portions 31 extending toward the two pushing abutting portions 20*b* respectively. The two pushing abutting portions 20*b* can push the two pushed portions 31 to drive the first locking component 3 to move from the first locking position to the first releasing position when the driven component 20 moves from the retracting position to the extending position. However, the numbers of the pushing abutting portion and the pushed portion are not limited to this embodiment. In another embodiment, the driven component can include only one pushing abutting portion, and the first locking component can include only one pushed portion.

As shown in FIG. 15 to FIG. 26, operational principle of the foldable locking mechanism 300 is provided as follows. When it is desired to fold the frame body 400 of the child carrier 500, the user can press the releasing operating component 17 to unlock the relative pivotal movement of the backrest 12 and the seat 13, and then operate the linking component 20 to drive the pushing component 19 to pivot relative to the first mounting seat 1 to drive the adjoining portion 191 of the pushing component 19 to push the adjoined portion 20*a* of the driven component 20, so that the driven component 20 is driven to move from the retracting position to the extending position for driving the first locking component 3 to move from the first locking position to the first releasing position. Similar to the first embodiment, since the first locking component 3 abuts against the second locking component, and the second locking component abuts against the third locking component, the second locking component and the third locking component can be driven to move to the second releasing position and the third releasing position respectively for unlocking the relative pivotal movement of the seat 13 and the rear leg 14, the relative pivotal movement of the rear leg 14 and the front leg 15, and the relative pivotal movement of the front leg 15 and the handle 16 when the first locking component 3 moves from the first locking position to the first releasing position. Afterwards, the user can operate the seat 13, the rear leg 14, the front leg 15 and the handle 16 to complete the folding operation of the frame body 400 of the child carrier 500 by the relative pivotal movement of the seat 13 and the rear leg 14, the relative pivotal movement of the rear leg 14 and the front leg 15 and the relative pivotal movement of the front leg 15 and the handle 16. When it is desired to unfold the frame body 400 of the child carrier 500, the unfolding operation of the frame body 400 can be completed by reversing the folding operation.

In summary, in the present invention, when the first mounting seat, the second mounting seat and the third mounting seat of the foldable locking mechanism are connected to the different rods of the frame body, the foldable locking mechanism can use the driving component to move the first locking component to the first releasing position to allow the relative pivotal movement of the first mounting seat and the second mounting seat and the relative pivotal movement of the second mounting seat and the third mounting seat at the same time, so that relative movements of the different rods are allowed at the same time to achieve the folding operation of the entire frame body. Therefore, the present invention has advantages of simple structure and easy operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A foldable locking mechanism comprising:
a first mounting seat;
a second mounting seat pivotally connected to the first mounting seat;
a third mounting seat pivotally connected to the second mounting seat;
a first locking component at least partially and movably disposed between the second mounting seat and the third mounting seat, the first locking component being movable between a first releasing position and a first locking position, a relative pivotal movement of the second mounting seat and the third mounting seat being allowed when the first locking component is located at the first releasing position, the relative pivotal movement of the second mounting seat and the third mounting seat being restrained when the first locking component is located at the first locking position;
a driving component disposed on the first mounting seat and abutting against the first locking component, the driving component being configured to drive the first locking component to move from the first locking position to the first releasing position for allowing a folding operation of the foldable locking mechanism;
a fourth mounting seat pivotally connected to the third mounting seat; and
a second locking component at least partially and movably disposed between third mounting seat and the fourth mounting seat.

2. The foldable locking mechanism of claim 1, wherein: the second locking component being movable between a second releasing position and a second locking position, a relative pivotal movement of the third mounting seat and the fourth mounting seat being allowed when the second locking component is located at the second releasing position, the relative pivotal movement of the third mounting seat and the fourth mounting seat being restrained when the second locking component is located at the second locking position, the second locking component abutting against the first locking component, and the first locking component driving the second locking component to move from the second locking position to the second releasing position when the first locking component moves from the first locking position to the first releasing position.

3. The foldable locking mechanism of claim 2, further comprising:
a fifth mounting seat pivotally connected to the fourth mounting seat; and
a third locking component at least partially and movably disposed between the fourth mounting seat and the fifth mounting seat, the third locking component being movable between a third releasing position and a third locking position, a relative pivotal movement of the fourth mounting seat and the fifth mounting seat being allowed when the third locking component is located at the third releasing position, the relative pivotal movement of the fourth mounting seat and the fifth mounting seat being restrained when the third locking component is located at the third locking position, the third locking component abutting against the second locking component, and the second locking component driving the third locking component to move from the third locking position to the third releasing position when the second locking component moves from the second locking position to the second releasing position.

4. The foldable locking mechanism of claim 3, wherein the third locking component is movable along an axial direction of a pivoting axis of the fourth mounting seat and the fifth mounting seat.

5. The foldable locking mechanism of claim 3, wherein the third locking component comprises a third engaging tooth, the fourth mounting seat comprises a third left engaged tooth cooperating with the third engaging tooth, the fifth mounting seat comprises a third right engaged tooth cooperating with the third engaging tooth, the third engaging tooth engages with the third engaging tooth and the third right engaged tooth when the third locking component is located at the third locking position, and the third engaging tooth disengages from the third engaging tooth when the third locking component is located at the third releasing position.

6. The foldable locking mechanism of claim 3, further comprising a third resilient component for driving the third locking component to move toward the third locking position.

7. The foldable locking mechanism of claim 2, wherein the first locking component comprises a first abutting portion extending toward the second locking component, and the first abutting portion passes through the third mounting seat to abut against the second locking component.

8. The foldable locking mechanism of claim 7, wherein a penetrating hole is formed on the third mounting seat and located at a position corresponding to the first abutting portion.

9. The foldable locking mechanism of claim 2, wherein the second locking component is movable along an axial direction of a pivoting axis of the third mounting seat and the fourth mounting seat.

10. The foldable locking mechanism of claim 2, wherein the second locking component comprises a second engaging tooth, the third mounting seat comprises a second left engaged tooth cooperating with the second engaging tooth, the fourth mounting seat comprises a second right engaged tooth cooperating with the second engaging tooth, the second engaging tooth engages with the second left engaged tooth and the second right engaged tooth when the second locking component is located at the second locking position, and the second engaging tooth disengages from the second left engaged tooth when the second locking component is located at the second releasing position.

11. The foldable locking mechanism of claim 2, further comprising a second resilient component for driving the second locking component to move toward the second locking position.

12. The foldable locking mechanism of claim 2, wherein the second locking component comprises a second abutting portion extending toward the third locking component, and the second abutting portion passes through the fourth mounting seat to abut against the third locking component.

13. The foldable locking mechanism of claim 12, wherein a penetrating hole is formed on the fourth mounting seat and located at a position corresponding to the second abutting portion.

14. The foldable locking mechanism of claim 1, wherein the driving component comprises a pushing portion disposed on the first mounting seat, the first locking component comprises a pushed portion extending toward the pushing portion, and the pushing portion pushes the pushed portion to drive the first locking component to move from the first locking position to the first releasing position when the first mounting seat and the second mounting seat are pivotally folded relative to each other.

15. The foldable locking mechanism of claim 14, wherein the pushing portion is a pushing inclined surface disposed on the first mounting seat, and the pushed portion is a protrusion cooperating with the pushing inclined surface.

16. The foldable locking mechanism of claim 15, wherein the pushing inclined surface is helical.

17. The foldable locking mechanism of claim 14, wherein a through hole is formed on the second mounting seat and located a position corresponding to the pushed portion, and the pushed portion slidably passes through the through hole.

18. The foldable locking mechanism of claim 1, wherein the first locking component is movable along an axial direction of a pivoting axis of the second mounting seat and the third mounting seat.

19. The foldable locking mechanism of claim 1, wherein the first locking component comprises a first engaging tooth, the second mounting seat comprises a first left engaged tooth cooperating with the first engaging tooth, the third mounting seat comprises a first right engaged tooth cooperating with the first engaging tooth, the first engaging tooth engages with the first left engaged tooth and the first right engaged tooth when the first locking component is located at the first locking position, and the first engaging tooth disengages from the first left engaged tooth when the first locking component is located at the first releasing position.

20. The foldable locking mechanism of claim 1, further comprising a first resilient component for driving the first locking component to move toward the first locking position.

21. The foldable locking mechanism of claim 1, wherein the driving component comprises:

a pushing component pivotally connected to the first mounting seat; and a driven component movably disposed between the pushing component and the first locking component and movable between an extending position and a retracting position, and the pushing component pivoting to drive the driven component to move from the retracting position to the extending position to push the first locking component from the first locking position to the first releasing position for allowing the folding operation of the foldable locking mechanism.

22. The foldable locking mechanism of claim 21, wherein the driving component further comprises a linking component connected to the pushing component and for driving the pushing component to pivot.

23. The foldable locking mechanism of claim 21, wherein the pushing component comprises an adjoining portion extending toward the driven component, the driven component comprises an adjoined portion, and the adjoining portion is configured to push the adjoined portion to drive the driven component to move from the retracting position to the extending position.

24. The foldable locking mechanism of claim 23, wherein the adjoining portion is an adjoining protrusion, the adjoined portion is an adjoined protrusion, the adjoining protrusion and the adjoined protrusion are misaligned from each other when the driven component is located at the retracting position, and the adjoining protrusion and the adjoined protrusion are aligned with and abutted against each other when the driven component is located at the extending position.

25. The foldable locking mechanism of claim 21, wherein the driven component comprises a pushing abutting portion, the first locking component comprises a pushed portion extending toward the pushing abutting portion, and the pushing abutting portion pushes the pushed portion to drive the first locking component to move from the first locking position to the first releasing position when the driven component moves from the retracting position to the extending position.

26. The foldable locking mechanism of claim 21, wherein the driven component is movable along an axial direction of a pivoting axis of the first mounting seat and the second mounting seat.

27. A foldable locking mechanism comprising:

a first mounting seat;

a second mounting seat pivotally connected to the first mounting seat;

a third mounting seat pivotally connected to the second mounting seat;

a first locking component at least partially and movably disposed between the second mounting seat and the third mounting seat, the first locking component being movable between a first releasing position and a first locking position, a relative pivotal movement of the second mounting seat and the third mounting seat being allowed when the first locking component is located at the first releasing position, the relative pivotal movement of the second mounting seat and the third mounting seat being restrained when the first locking component is located at the first locking position;

a driving component disposed on the first mounting seat and abutting against the first locking component, the driving component being configured to drive the first locking component to move from the first locking position to the first releasing position for allowing a folding operation of the foldable locking mechanism; and a limiting assembly for limiting a relative pivotal angle of the first mounting seat and the second mounting seat; the limiting assembly comprises a limiting component installed on the second mounting seat and protruding toward the first mounting seat.

28. The foldable locking mechanism of claim 27, wherein a limiting slot is formed on the first mounting seat and located at a position corresponding to the limiting component, and the limiting component slidably stretches into the limiting slot.

29. The foldable locking mechanism of claim 28, wherein the limiting assembly further comprises a fourth resilient component, the limiting component is installed on the second mounting seat by the fourth resilient component, and the fourth resilient component is for driving the limiting component to resiliently abut against the limiting slot.

30. The foldable locking mechanism of claim 28, wherein the limiting component is a circular column.

31. The foldable locking mechanism of claim 28, wherein a passing hole is formed on the second mounting seat and located at a position corresponding to the limiting component, and the limiting component slidably passes through the passing hole.

\* \* \* \* \*